United States Patent
Itagaki et al.

(10) Patent No.: US 11,082,141 B2
(45) Date of Patent: Aug. 3, 2021

(54) WIRELESS APPARATUS AND WIRELESS APPARATUS PROCESSING METHOD

(71) Applicant: Sony Corporation, Tokyo (JP)

(72) Inventors: Takeshi Itagaki, Saitama (JP); Hideyuki Suzuki, Tokyo (JP); Junji Kato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/605,503

(22) PCT Filed: May 17, 2018

(86) PCT No.: PCT/JP2018/019081
§ 371 (c)(1),
(2) Date: Oct. 16, 2019

(87) PCT Pub. No.: WO2018/221238
PCT Pub. Date: Dec. 6, 2018

(65) Prior Publication Data
US 2020/0127751 A1  Apr. 23, 2020

(30) Foreign Application Priority Data
Jun. 2, 2017 (JP) .............................. JP2017-110224

(51) Int. Cl.
*H04J 3/06* (2006.01)
*H04W 56/00* (2009.01)

(52) U.S. Cl.
CPC .......... *H04J 3/0667* (2013.01); *H04J 3/0685* (2013.01); *H04W 56/0015* (2013.01)

(58) Field of Classification Search
None
See application file for complete search history.

(56) References Cited

U.S. PATENT DOCUMENTS 9,237,546 B1 * 1/2016 Zhang .................. H04W 4/029
9,651,672 B2 * 5/2017 Alpert .................... G01S 19/23
(Continued)

FOREIGN PATENT DOCUMENTS

JP   2008-64474 A    3/2008
JP   2010-177778 A   8/2010
(Continued)

OTHER PUBLICATIONS

Extended European Search Report dated Apr. 29, 2020 in European Patent Application No. 18809371.0, 8 pages.
(Continued)

*Primary Examiner* — Ajit Patel
(74) *Attorney, Agent, or Firm* — Xsensus LLP

(57) ABSTRACT

An object of this technology is for one apparatus to effectively notify the other apparatus whether or not synchronization target clocks are correctly synchronized therebetween. A wireless apparatus includes a main control section, a wireless control section, and a clock synchronization management section. The main control section manages time using a first clock (synchronization target clock). The wireless control section manages time using a second clock (reference clock). The synchronization management section manages a clock synchronization state. The wireless control section notifies another wirelessly connected wireless apparatus of information regarding the clock synchronization state through transmission of a frame.

20 Claims, 25 Drawing Sheets

(56) References Cited

U.S. PATENT DOCUMENTS

| | | | |
|---|---|---|---|
| 2004/0005902 A1* | 1/2004 | Belcea | H04J 3/0667 455/502 |
| 2012/0079310 A1 | 3/2012 | Matsusue et al. | |
| 2013/0243140 A1* | 9/2013 | Buhl | H04L 7/04 375/362 |
| 2014/0254511 A1* | 9/2014 | Aldana | H04W 56/0035 370/329 |
| 2015/0188691 A1* | 7/2015 | Mizuguchi | H04B 7/18513 375/355 |
| 2015/0295669 A1* | 10/2015 | Chapman | H04L 12/2801 370/503 |
| 2016/0262122 A1* | 9/2016 | Aldana | H04J 3/0667 |
| 2017/0055235 A1 | 2/2017 | Rabii et al. | |
| 2017/0094619 A1* | 3/2017 | Aldana | G01S 13/765 |
| 2017/0188191 A1* | 6/2017 | Aldana | G01S 11/08 |
| 2017/0238135 A1* | 8/2017 | Vamaraju | H04W 56/0015 455/456.1 |

FOREIGN PATENT DOCUMENTS

| | | |
|---|---|---|
| JP | 2011-234007 A | 11/2011 |
| JP | 2013-074527 A | 4/2013 |

OTHER PUBLICATIONS

International Search Report and Written Opinion dated Aug. 14, 2018 for PCT/JP2018/019081 filed on May 17, 2018, 7 pages including English Translation of the International Search Report.

IEEE, "IEEE Standard for a Precision Clock Synchronization Protocol for Networked Measurement and Control Systems", IEEE Std 1588™—2008, 3 Park Avenue, New York, USA, Jul. 24, 2008, pp. 1-269.

IEEE, "IEEE Standard for Information technology—Telecommunications and information exchange between systems Local and metropolitan area networks—Specific requirements", IEEE Std 802.11™—2016, 3 Park Avenue, New York, USA, pp. 1-3532.

* cited by examiner

OPERATIONAL OVERVIEW OF IEEE 1588 Precision Time Protocol

OPERATIONAL OVERVIEW OF IEEE 802.11 Fine Timing Measurement Protocol

Format OF FTM Action Frame

| MAC header | Category (Public) | Public Action (FTM) | Dialog Token | Follow Up Dialog Token | ToD | ToA | ToD Error | ToA Error |
|---|---|---|---|---|---|---|---|---|

FIG. 4

Format OF EXTENDED FTM Action Frame IN COMBINATION WITH 802.11AS

| MAC header | Category (Public) | Public Action (FTM) | Dialog Token | Follow Up Dialog Token | ToD | ToA | ToD Error | ToA Error | Vendor Specific element |

Vendor Specific element:

| Element ID | Length | OUI/ CID | Type (0) | PTP message header | precise Origin Timestamp | Follow Up information TLV |

Table 10-4-PTP message header

| | Bits | | | | | | | | Octets | Offset |
|---|---|---|---|---|---|---|---|---|---|---|
| 8 | 7 | 6 | 5 | 4 | 3 | 2 | 1 | | | |
| transportSpecific | | | | messageType | | | | 1 | 0 |
| reserved | | | | versionPTP | | | | 1 | 1 |
| messageLength | | | | | | | | 2 | 2 |
| domainNumber | | | | | | | | 1 | 4 |
| reserved | | | | | | | | 1 | 5 |
| flags | | | | | | | | 2 | 6 |
| correctionField | | | | | | | | 8 | 8 |
| reserved | | | | | | | | 4 | 16 |
| sourcePortIdentity | | | | | | | | 10 | 20 |
| sequenceId | | | | | | | | 2 | 30 |
| control | | | | | | | | 1 | 32 |
| logMessageInterval | | | | | | | | 1 | 33 |

Table 11-10-Follow_Up information TLV

| | Bits | | | | | | | Octets | offset |
|---|---|---|---|---|---|---|---|---|---|
| 8 | 7 | 6 | 5 | 4 | 3 | 2 | 1 | | |
| tlvType | | | | | | | | 2 | 0 |
| lengthField | | | | | | | | 2 | 2 |
| organizationId | | | | | | | | 3 | 4 |
| organizationSubType | | | | | | | | 3 | 7 |
| cumulativeScaledRateOffset | | | | | | | | 4 | 10 |
| gmTimeBaseIndicator | | | | | | | | 2 | 14 |
| lastGmPhaseChange | | | | | | | | 12 | 16 |
| scaledLastGmFreqChange | | | | | | | | 4 | 28 |

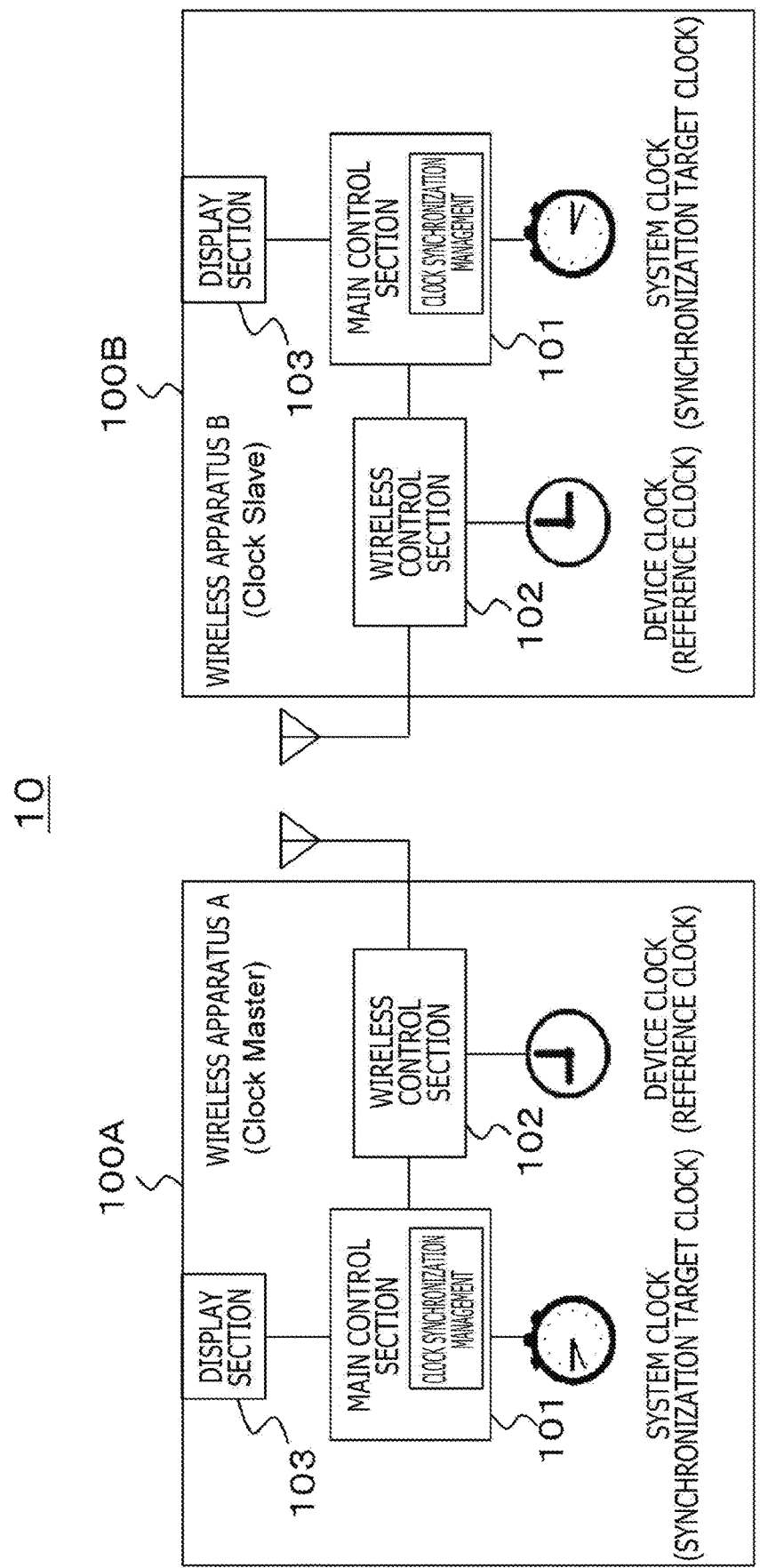

FIG. 12  Format OF EXTENDED FTM REQUEST Frame

FIG. 13  Format OF EXTENDED FTM Action Frame

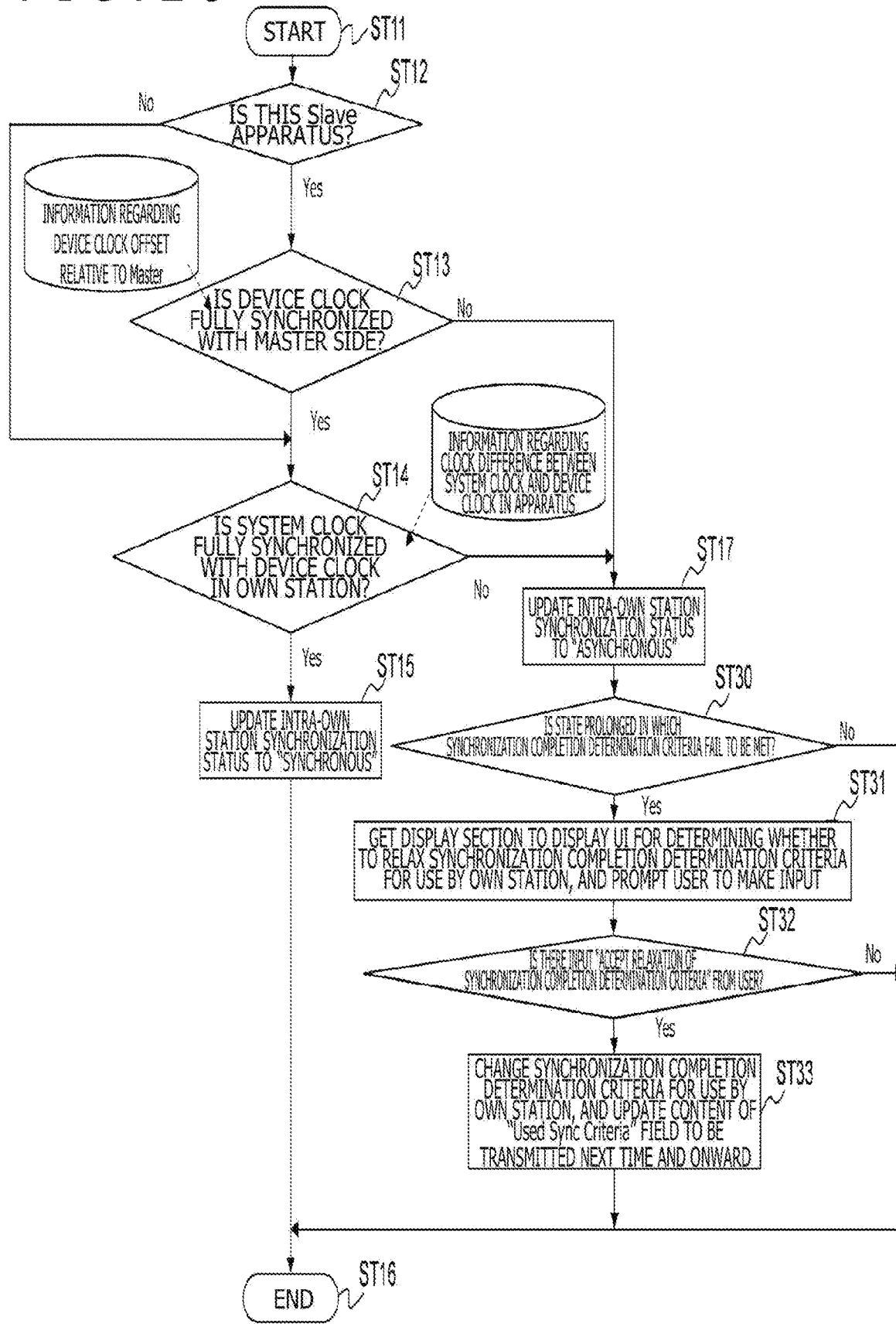

WIRELESS APPARATUS AND WIRELESS APPARATUS PROCESSING METHOD

CROSS-REFERENCE TO RELATED APPLICATIONS

The present application is based on PCT filing PCT/JP2018/019081, filed May 17, 2018, which claims priority to JP 2017-110224, filed Jun. 2, 2017, the entire contents of each are incorporated herein by reference.

TECHNICAL FIELD

The present technology relates to a wireless apparatus and a wireless apparatus processing method.

BACKGROUND ART

There exist, for example, two methods (A) and (B) outlined below for synchronizing the clocks of two wireless apparatuses connected by a wireless LAN. Each of the wireless apparatuses includes a clock for managing the time of its main control section (system clock) and a clock for managing the time of its wireless control section (device clock=NIC clock). The system clocks of the two apparatuses are synchronized by way of their wireless control sections.
(A) Method that Uses the PTP of the IP Layer Level This method, which uses frames of which the formats are based on the IEEE 1588 PTP (Precision Time Protocol), i.e., the SYNC frame, FOLLOW_UP frame, PDELAY_Req frame, and PDELAY_Resp frame, involves having the frames exchanged via a wireless medium for system clock synchronization (see NPL 1). The formats are devised to assume the provision of timestamps on a higher-level layer, which entails the disadvantage of worsening synchronization accuracy.
(B) Method that Uses the Clock Synchronization of the Wireless Layer Level This method, which uses the FTM (Fine Timing Measurement) protocol stipulated in the 802.11-2016 standard, involves first obtaining device clock drift between apparatuses for device clock synchronization therebetween (see NPL 2). Thereafter, the time values of the device clocks are reflected in the system clocks.

CITATION LIST

Non Patent Literature

[NPL 1]
  1588-2008—IEEE Standard for a Precision Clock Synchronization Protocol for Networked Measurement and Control Systems
[NPL 2]
  IEEE 802.11-2016, IEEE Standard for Information technology?Telecommunications and information exchange between systems Local and metropolitan area networks?Specific requirements Part 11: Wireless LAN Medium Access Control (MAC) and Physical Layer (PHY) Specifications

SUMMARY

Technical Problem

Synchronization between the system clock of one apparatus and that of another wirelessly connected apparatus is achieved under the following conditions: that the device clocks of the two apparatuses are synchronized with each other or are possible to synchronize with each other through the conversion of precisely acquired clock drift therebetween, and that the device clock and system clock settings have been mutually reflected in each of the apparatuses.

However, it is generally impossible for one apparatus to know whether or not its device clock and system clock settings have been reflected in the other apparatus. This requires each apparatus to wirelessly transmit a higher-layer message to the other apparatus for communication therewith. One problem here is that generating and transmitting the dedicated message is inefficient both in the use of a wireless medium and in the workings of processors.

An object of the present technology is for one apparatus to efficiently notify the other apparatus whether or not synchronization target clocks are correctly synchronized therebetween.

Solution to Problem

According to one concept of the present technology, there is provided a wireless apparatus including: a main control section configured to manage time using a first clock; a wireless control section configured to manage time using a second clock; and a clock synchronization management section configured to manage a clock synchronization state. The wireless control section notifies another wirelessly connected wireless apparatus of information regarding the clock synchronization state through transmission of a frame.

The wireless apparatus of the present technology includes the main control section, wireless control section, and clock synchronization management section. The main control section manages time using the first clock. The wireless control section manages time using the second clock. The synchronization management section manages the clock synchronization state. The other wirelessly connected wireless apparatus is notified of the information regarding the clock synchronization state through transmission of the frame.

For example, the information regarding the clock synchronization state may include information regarding synchronization status. In this case, the synchronization status may have either two types of status, i.e., synchronous and asynchronous, or three types of status, i.e., synchronous, asynchronous, and unsynchronizable due to vigorous synchronization criteria, for example.

Also, in this case, the clock synchronization management section may determine that the synchronous status is reached if the absolute value of a clock difference between the first clock and the second clock within a predetermined time period is equal to or smaller than a second threshold value. In this case, the clock synchronization management section may determine that the synchronous status is reached if the absolute value of a clock difference between the first clock and the second clock within a predetermined time period is equal to or smaller than a second threshold value and if the absolute value of an offset of the second clock relative to the other wireless apparatus within a predetermined time period is equal to or smaller than a first threshold value. Also, in this case, if the asynchronous status is prolonged for a predetermined time period, the clock synchronization management section may determine that the unsynchronizable status due to vigorous synchronization criteria is reached.

As another example, the information regarding the clock synchronization state may further include criteria for determining the synchronization status. As a further example, the information regarding the clock synchronization state may further include information regarding a transmission failure probability of the frame. As an even further example, the information regarding the clock synchronization state may further include information regarding a wireless traffic load. As a still further example, the information regarding the clock synchronization state may further include information regarding clock drift between the second clock and that of the other wireless apparatus.

As a yet further example, the wireless control section may transmit to the other wireless apparatus information for associating the first clock with the second clock through transmission of the frame. The associating information may further include information regarding a clock difference between the two clocks. In this case, the associating information may further include information regarding a clock granularity ratio between the two clocks.

As another example, the wireless control section may transmit the information regarding the clock synchronization state as part of the frame for measuring the time of the wireless control section relative to the other wireless apparatus. As a further example, the wireless apparatus may further include a display section configured to display a user interface based on the information regarding the clock synchronization state. In this case, if the asynchronous status is prolonged for a predetermined time period, the clock synchronization management section may cause the display section to display the user interface requesting a user to determine whether or not to relax synchronization completion determination criteria for use by the own station. If the user accepts the relaxation of the criteria, the clock synchronization management section may change the synchronization criteria.

According to the present technology, as outlined above, the wireless control section notifies the other wirelessly connected wireless apparatus of the information regarding the clock synchronization status through transmission of the frame. This makes it possible for one apparatus to efficiently notify the other apparatus whether or not synchronization target clocks are correctly synchronized therebetween.

According to another concept of the present technology, there is provided a wireless apparatus including: a main control section configured to manage time using a first clock; and a wireless control section configured to manage time using a second clock. The wireless control section detects information regarding a clock synchronization state by receiving a frame from another wirelessly connected wireless apparatus. The wireless apparatus further includes a display section configured to display a user interface based on the information regarding the clock synchronization state.

According to the present technology, the wireless apparatus includes the main control section and wireless control section. The main control section manages time using the first clock. The wireless control section manages time using the second clock. The wireless control section detects information regarding the clock synchronization state by receiving the frame from the other wirelessly connected wireless apparatus. The display apparatus is provided to display the user interface based on the information regarding the clock synchronization state. For example, the wireless apparatus may further include an application section configured to perform processing based on the first clock.

For example, the information regarding the clock synchronization state may include information regarding synchronization status. In this case, the synchronization status may have either two types of status, i.e., synchronous and asynchronous, or three types of status, i.e., synchronous, asynchronous, and unsynchronizable due to vigorous synchronization criteria, for example.

Also, in this case, if the synchronization status indicates unsynchronizable status due to rigorous synchronization criteria, the display section may display the user interface requesting a user to determine whether or not to relax the criteria for synchronization with the other wireless apparatus. If the user accepts the relaxation of the criteria for synchronization with the other wireless apparatus, the wireless control section may notify the other wireless apparatus of the relaxation of the synchronization criteria through transmission of the frame.

According to the present technology, as outlined above, the wireless control section detects the information regarding the clock synchronization state by receiving the frame from the other wirelessly connected wireless apparatus. A user interface is then displayed on the basis of the detected information. This makes it possible to appropriately notify the user of the clock synchronization state.

Advantageous Effect of Invention

According to the present technology, it is possible for one apparatus to efficiently notify the other apparatus whether or not the synchronization target clocks are correctly synchronized therebetween. Incidentally, the advantageous effects outlined above are not limitative of the present disclosure. Further advantages will become apparent from a reading of the present disclosure.

BRIEF DESCRIPTION OF DRAWINGS

FIG. 4 is a schematic diagram depicting the format of an extended FTM action frame in a case where the 802.1AS standard and the 802.11 FTM protocol are used in combination.

FIG. 5 is a block diagram depicting a configuration example of a wireless system as an embodiment of the present technology.

FIG. 26 is a flowchart depicting an exemplary flow of yet another intra-own station synchronization completion determination process.

DESCRIPTION OF EMBODIMENTS

The embodiments for implementing the present technology (referred to as the embodiments) are described below. The description will be given under the following headings:
1. Embodiments
First embodiment
Second embodiment
2. Variations 1. Embodiments

[Explanation of the Reference Standard]
The standard to be referenced is explained below. The IEEE 1588 standard "1588-2008—IEEE Standard for a Precision Clock Synchronization Protocol for Networked Measurement and Control Systems" has been prescribed as a correction method for performing highly precise clock synchronization between apparatuses. The protocol of this standard is called the PTP (Precision Time Protocol).

Figure 1:
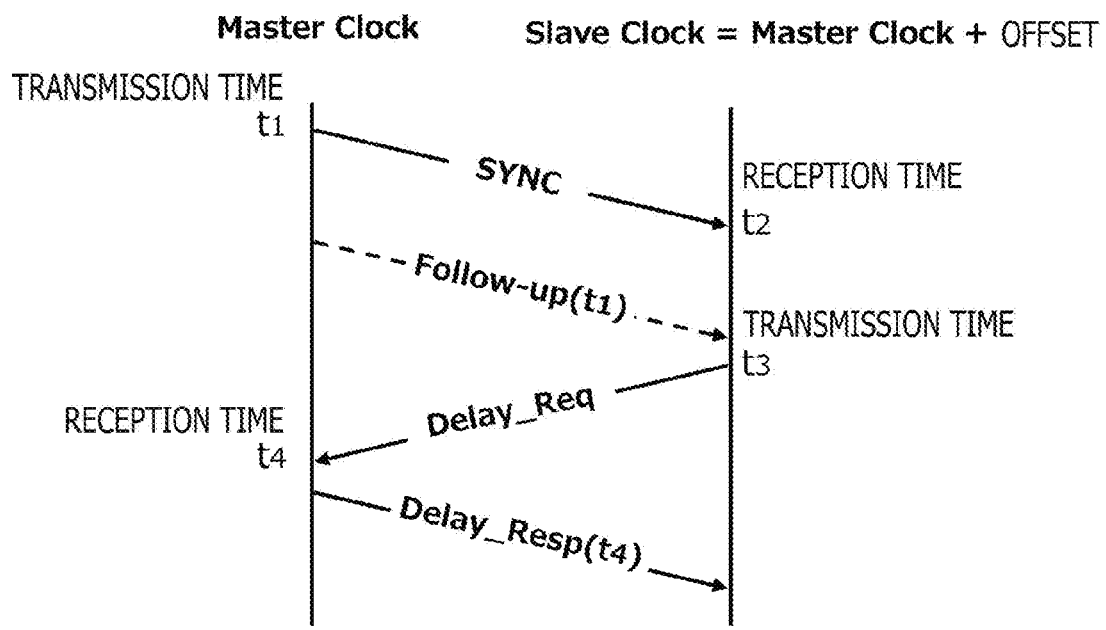
FIG. 1 is a schematic diagram depicting an operational overview of the PTP (Precision Time Protocol).

FIG. 1 depicts an operational overview of the PTP. Although not explained here in detail, the clock drift between a master and a slave is expressed by the following mathematical expression (1) using the times noted in FIG. 1:

[Math. 1]

$$\text{offset} = \frac{1}{2}\{(t_2 - t_1) - (t_4 - t_3)\} \quad (1)$$

Also, the 802.1AS standard "802.1AS-2011—IEEE Standard for Local and Metropolitan Area Networks—Timing and Synchronization for Time-Sensitive Applications in Bridged Local Area Networks" has been defined as the standard for higher layers on which the functions of the PTP method are prescribed for LAN (Local Area Network) purposes. This standard prescribes algorithms for master clock selection and clock repeating methods that, while referencing the IEEE 1588 standard, are independent of lower-layer communication methods. The standard further defines interfaces for providing dedicated counting mechanisms that calculate clock drift more accurately with regard to several lower-layer communication methods.

The 802.11-2016 standard then prescribes the FTM (Fine Timing Measurement) protocol based on the PTP concept as a protocol under which highly precise synchronization is performed between wireless apparatuses (clock drift detection) in a case where an IEEE 802.11 wireless LAN is used as a lower-layer communication method in combination with the 802.1AS standard.

Figures 2, 3:
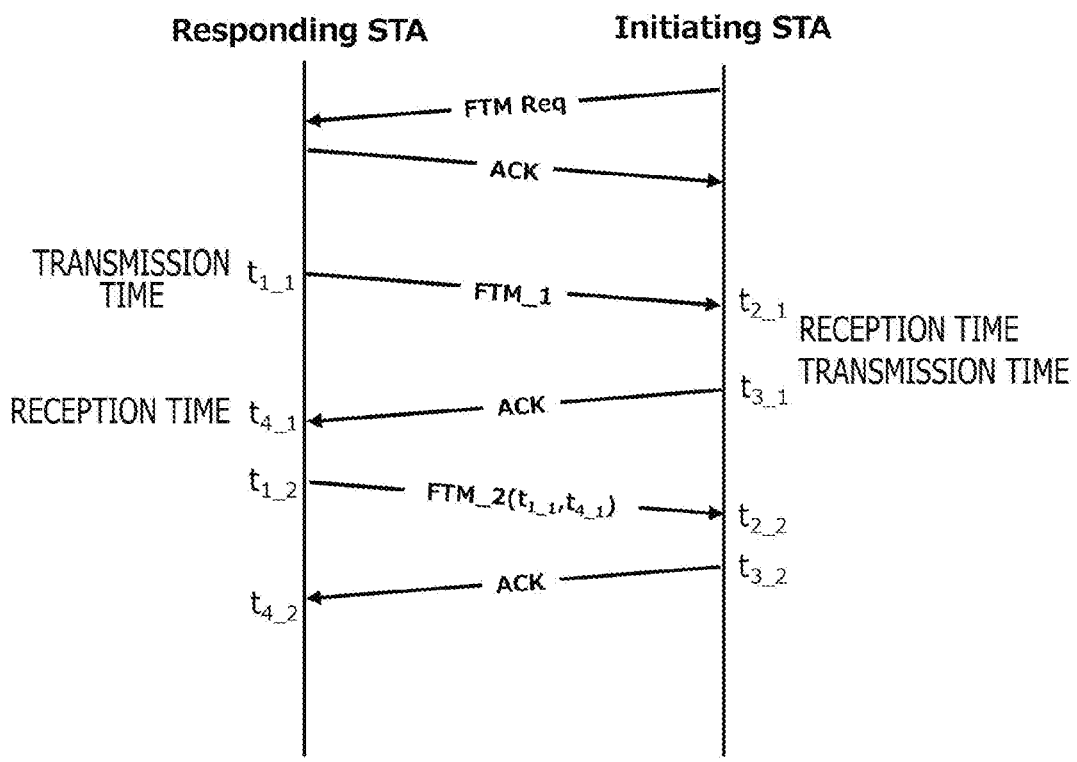
FIG. 2 is a schematic diagram depicting an operational overview of the FTM (Fine Timing Measurement) protocol.
FIG. 3 is a schematic diagram depicting the format of an FTM action frame.

FIG. 2 depicts an operational overview of the FTM protocol. The clock drift between a master ("Responder" in FIG. 2) and a slave ("Initiator" in FIG. 2) is obtained likewise using the above mathematical expression (1) in which t1 to t4 are replaced with t1_1 to t1_4 respectively.

FIG. 3 depicts the format of an FTM action frame as the frame for counting the time of the wireless control section in one apparatus relative to the other wireless apparatus, as illustrated in FIG. 2. In this format, the portion corresponding to the payload of the FTM action frame is a "Dialog Token" field and subsequent fields. The "Dialog Token" and "Follow Up Dialog Token" fields serve as an index for associating the FTM action frames transmitted multiple times.

The "Follow Up Dialog Token" field indicates to which previously transmitted FTM action frame the "ToD" and "ToA" fields subsequent to the "Follow Up Dialog Token" field correspond.

The "ToD" field and the "ToA" field are 48-bit fields that hold time information (timestamps) corresponding to time t1_1 and time t4_1 in FIG. 2, respectively, of values in picoseconds. The "ToD Error" field and the "ToA Error" field are set with information indicative of maximum errors of a "ToD" timestamp and a "ToA" timestamp, respectively.

Whereas FIG. 3 depicts the format in a case where the FTM protocol is used alone, an extended FTM action frame is employed where the 802.1AS standard and the 802.11 FTM protocol are used in combination. FIG. 4 depicts the format of the extended FTM action frame. The format includes a newly added "Vendor Specific Element" field. The purpose of this element is to hold information needed at the time of repeating and transmitting the time of a separate Grand Master clock.

First Embodiment

A first embodiment of the present technology is explained below. FIG. 5 depicts a configuration example of a wireless system 10 as an embodiment of the present technology. The wireless system 10 is configured with a wireless apparatus 100A and a wireless apparatus 100B. In the configuration of this embodiment, the wireless apparatus 100A is a wireless apparatus A acting as a clock master and the wireless apparatus 100B is a wireless apparatus B acting as a clock slave.

The wireless apparatuses 100A and 100B include a main control section 101, a wireless control section 102, and a display section 103 each. The main control section 101 corresponds to a host processor of the apparatus, and primarily performs communication protocol processes on the network layer and higher layers, such as executing application programs, controlling medium interface input/output signals, and managing clock synchronization. Examples of medium interface input/output include audio and visual output timing control in addition to the input of operation signals.

The wireless control section 102 is a functional block that assumes all wireless protocol functions for the communication layers primarily under the data link layer, including addition of a data link layer header to higher-layer packets generated by the main control section 101, analysis of the data link layer header, modulation, demodulation, error correction encoding and decoding processes, and amplification. Generally, the wireless control section 102 is a device independent of the main control section 101 and connected with the main control section 101 via a suitable I/O port.

The display section 103 is used to present a display for prompting a user to make input or a display requesting the user's determination (user interface display), for example. Incidentally, the display section 103 may not be necessarily attached to the wireless apparatuses 100A and 100B. Alternatively, the display section 103 may be implemented as an independent display apparatus connected in wired or wireless fashion with the wireless apparatuses 100A and 100B.

The wireless apparatuses 100A and 100B have a system clock (synchronization target clock) each. The system clock that manages the time of the main control section 101 is managed and referenced by the main control section 101. The wireless control section 102 has a device clock (reference clock). The device clock that manages the time of the wireless control section 102 is managed and referenced by the wireless control section 102.

The above-mentioned times t1_1 (ToD) and t4_1 (ToA) need to hold a wireless frame transmission time and a wireless frame reception start time as precisely as possible. The device clock is used to detect the transmission timing and reception timing without clock drift. Whereas the configuration example in FIG. 5 has a single wireless apparatus as a clock slave, there may be configurations involving two or more wireless apparatuses as clock slaves.

Figure 6:
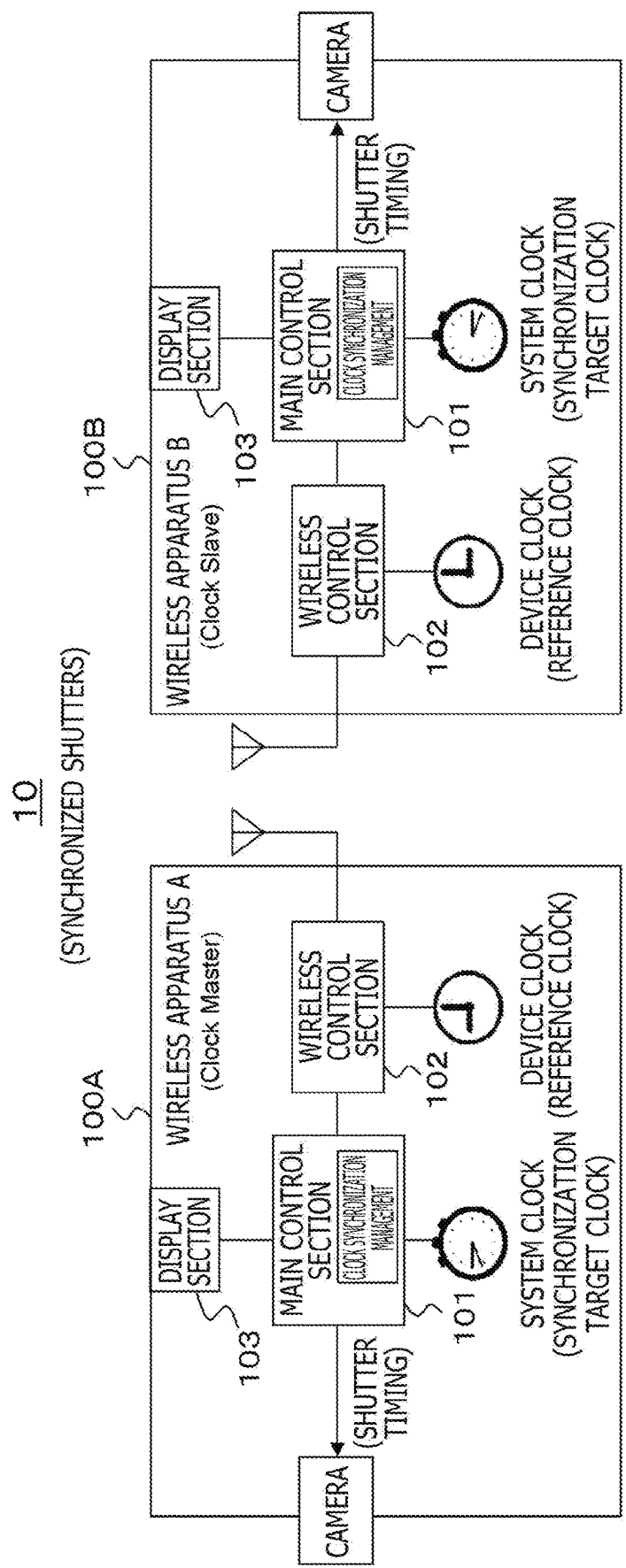
FIG. 6 is a block diagram depicting a configuration example of a wireless system in a case where the shutters of multiple imaging devices are synchronized in timing.
Figure 7:
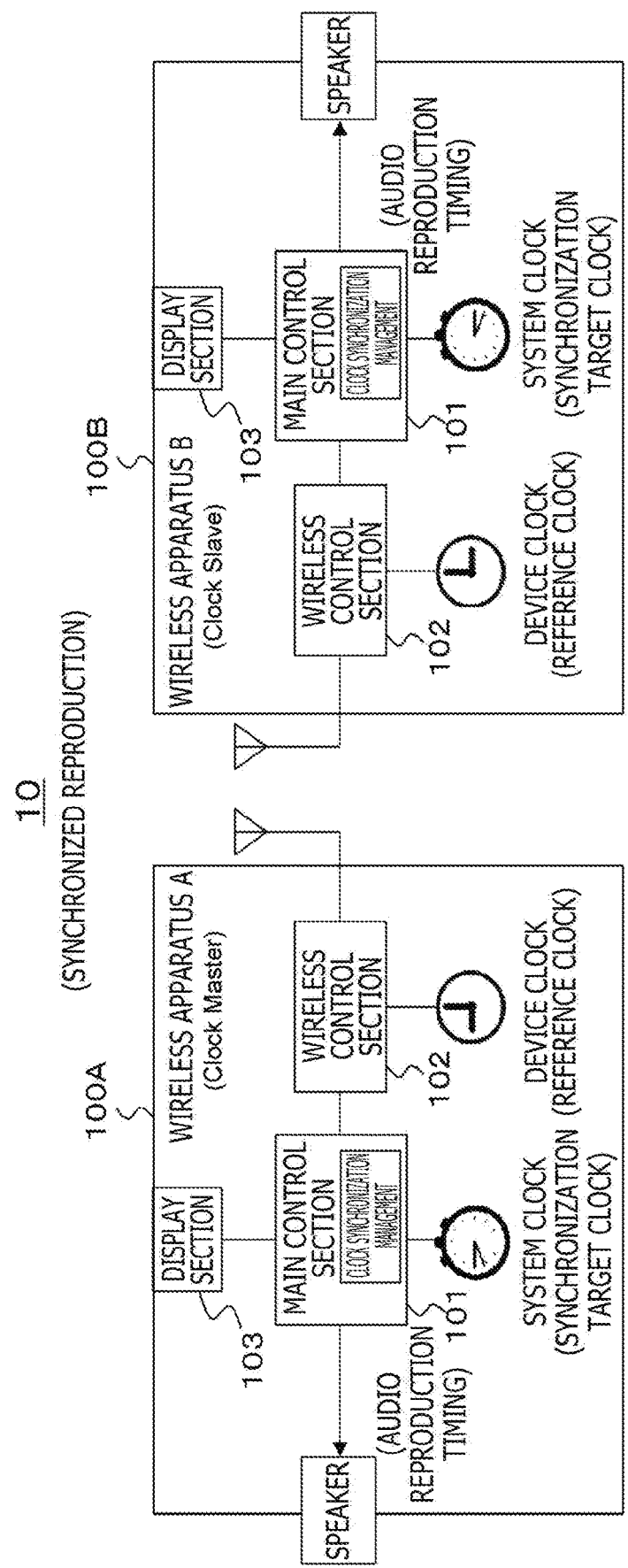
FIG. 7 is a block diagram depicting a configuration example of a wireless system in a case where multiple audio devices are synchronized for audio reproduction.
Figure 8:
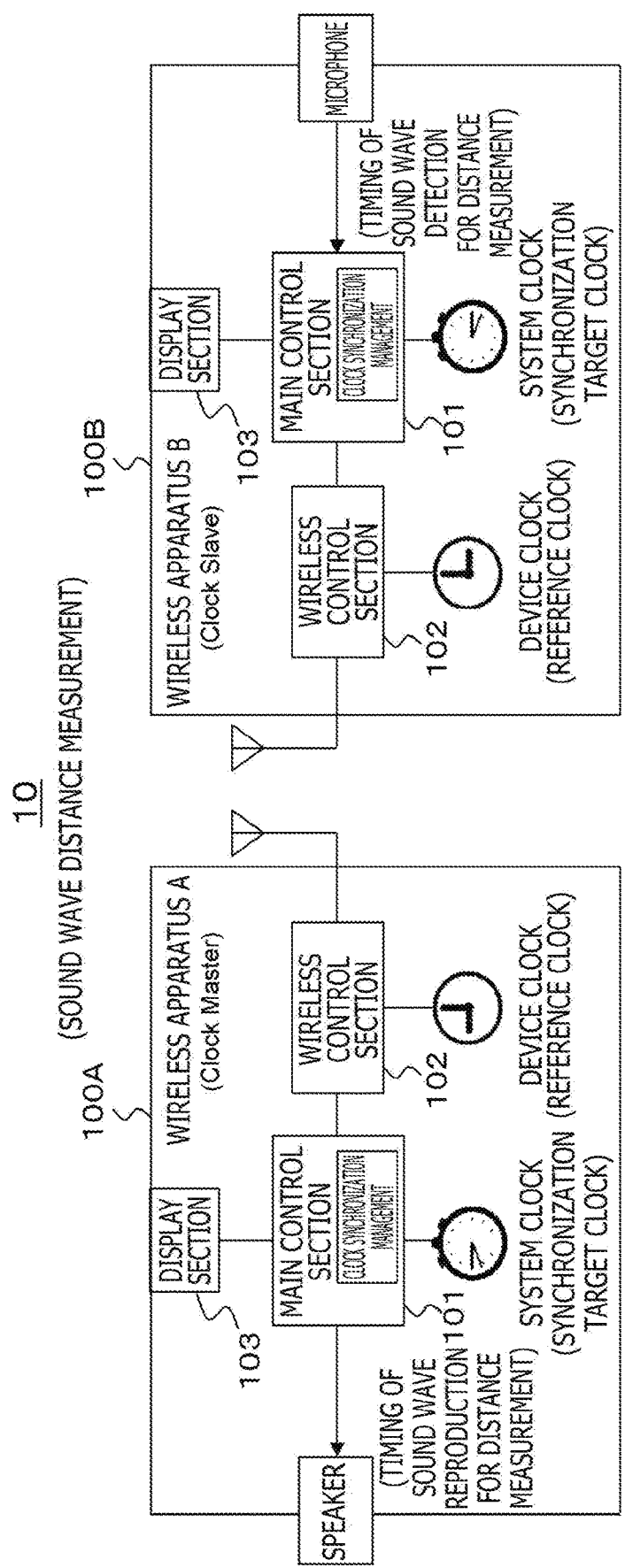
FIG. 8 is a block diagram depicting a configuration example of a wireless system in a case where a speaker and a microphone are used for sound wave distance measurement.

FIGS. 6 to 8 depict configuration examples of the wireless system 10, each example indicating how an application using clock synchronization is practiced. In these drawings, the parts corresponding to those in FIG. 5 are designated by like reference characters. FIG. 6 depicts a configuration example in a case where the shutters of multiple imaging devices are synchronized in timing. FIG. 7 depicts a configuration example in a case where multiple audio devices are synchronized for audio reproduction. FIG. 8 depicts a configuration example in a case where a speaker and a microphone are used for sound wave distance measurement.

In each of these configuration examples, the system clock (synchronization target clock) is used for timing acquisition.

Figure 9:
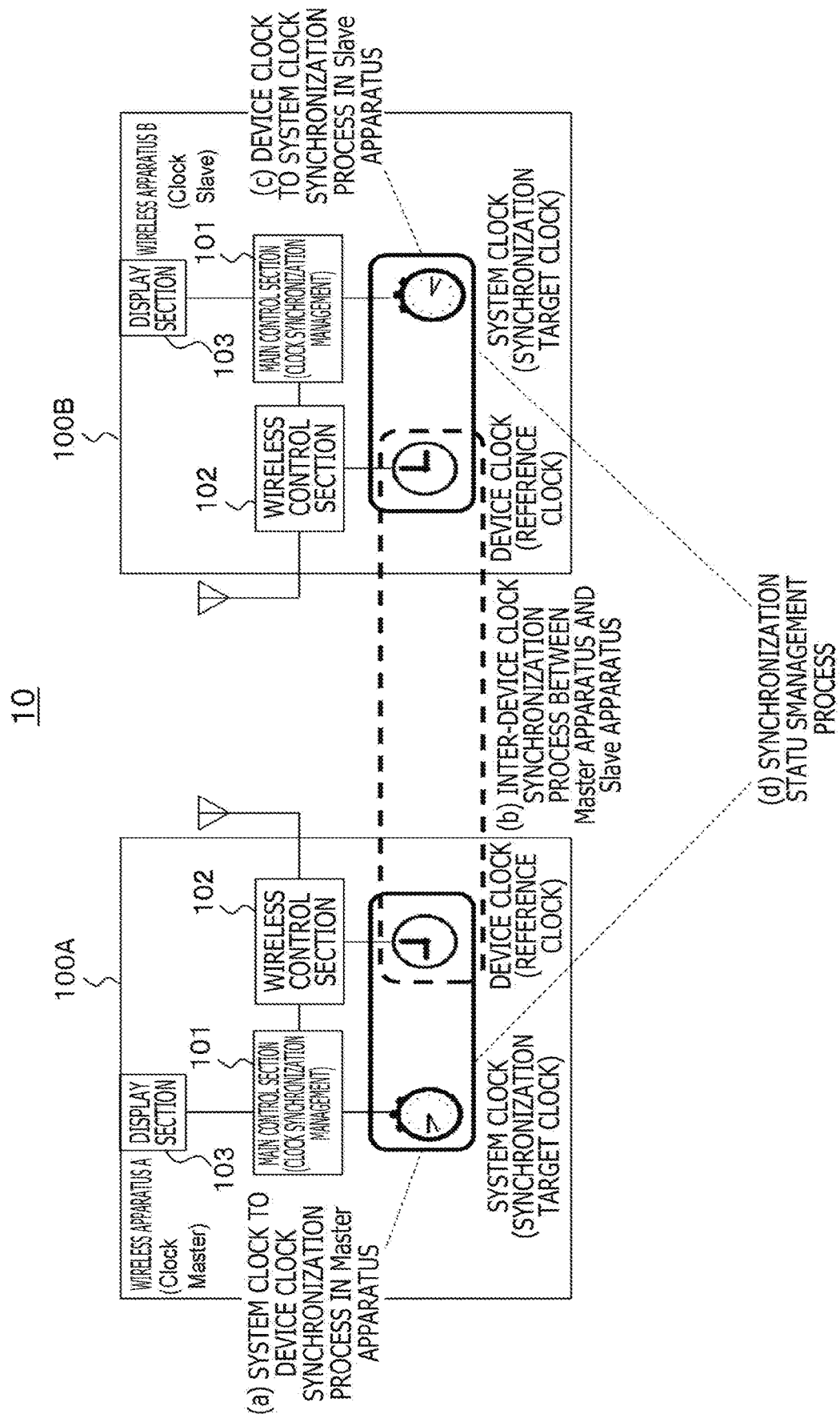
FIG. 9 is a block diagram depicting the procedure for synchronizing the system clocks of two wireless apparatuses constituting a communication system.

Explained below with reference to FIG. 9 is the procedure for synchronizing the system clocks (synchronization target clocks) of two wireless apparatuses 100A and 100B constituting a communication system 10. It is assumed that the operations for connecting the wireless apparatuses 100A and 100B have been completed and that the clock roles of a clock master and a clock slave have been assigned to the respective apparatuses. The procedure is divided into four processes (a) to (d) when explained below. The processes (a) to (c) may be performed either sequentially or in parallel with each other. The process (d) is carried out in parallel with the processes (a) to (c).

[(a) System Clock to Device Clock Synchronization Process (in the Wireless Apparatus A)]

Figure 10:
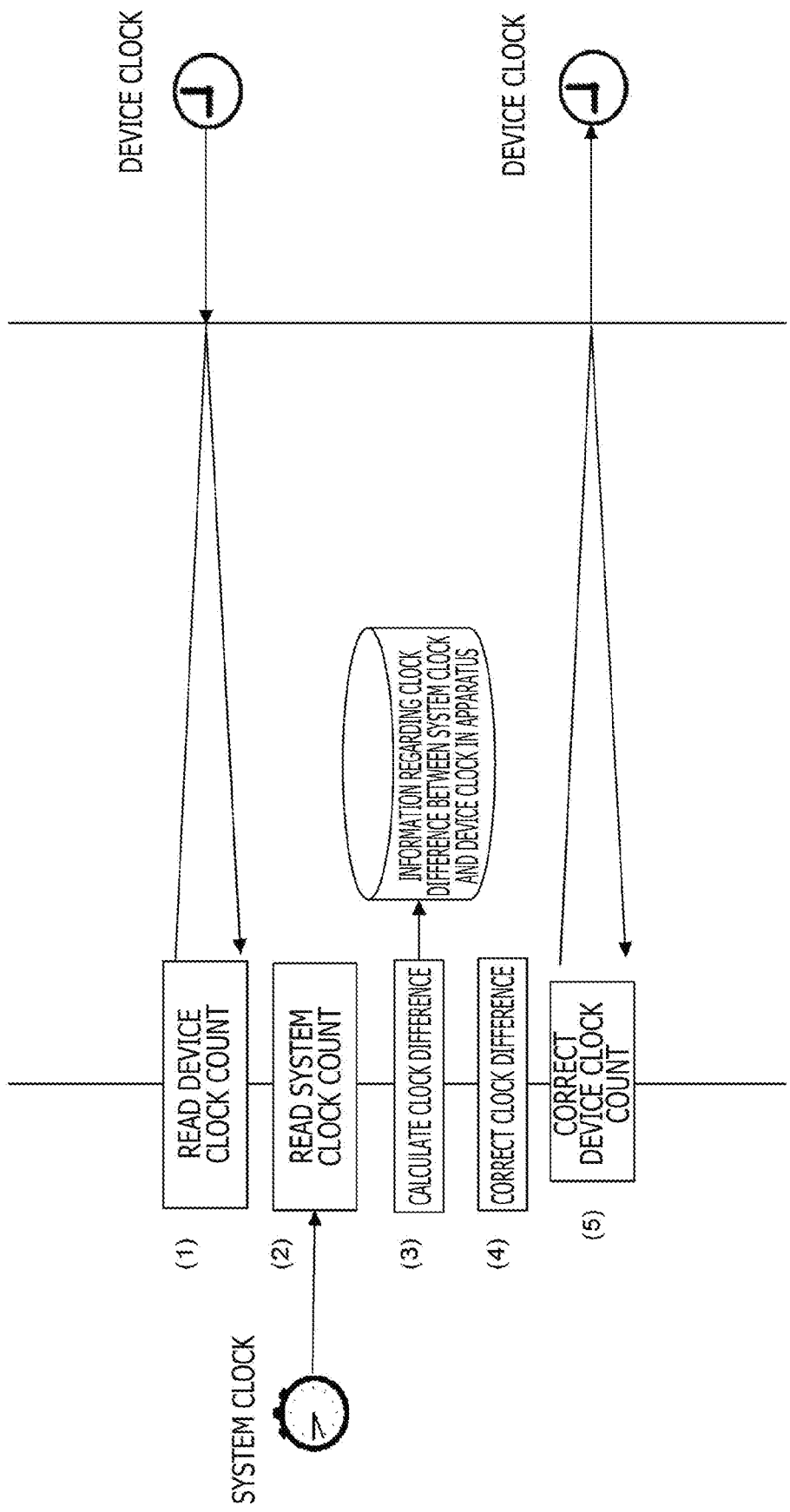
FIG. 10 is a flowchart depicting an exemplary flow of the process of causing the time of the system clock in a wireless apparatus A acting as a master apparatus to be reflected in its device clock.

This process involves causing the time of the system clock to be reflected in the device clock on the side of the wireless apparatus A (wireless apparatus 100A) acting as a master apparatus. FIG. 10 depicts the process flow involved.

(1) First, the main control section 101 reads the count of the device clock on the side of the wireless control section 102.

(2) The main control section 101 then reads the count of the system clock.

(3) The main control section 101 then unifies the device clock and system clock in granularity, i.e., in units, before calculating a clock difference therebetween.

(4) The main control section 101 then performs a correction process on the clock difference to attain higher accuracy. For example, an interface delay and a process delay between the main control section 101 and the wireless control section 102 are estimated by preliminary measurement, and the correction process is performed to eliminate the effects of the delays beforehand. The correction process may be carried out as needed.

(5) The main control section 101 then causes the clock difference to be reflected as a correction value in the device clock of the wireless control section 102 to correct the device clock count. There are multiple ways to have the clock difference reflected: get the device clock count directly overwritten with the clock count value, approach the correct clock count in multiple increments using a suitable filter, or gradually comply with the correct clock count by adjusting the manner in which the clock count progresses, for example.

The main control section 101 monitors and retains a series of the clock differences over a predetermined past period calculated in step (3) above as the input information for knowing the synchronization status between the device clock (reference clock) and the system clock (synchronization target clock) inside the apparatus. This information will be used in a synchronization status management process (d), to be discussed below.

[(b) Inter-Device Clock Synchronization Process (Between Wireless Apparatus a and Wireless Apparatus B)]

Figure 11:
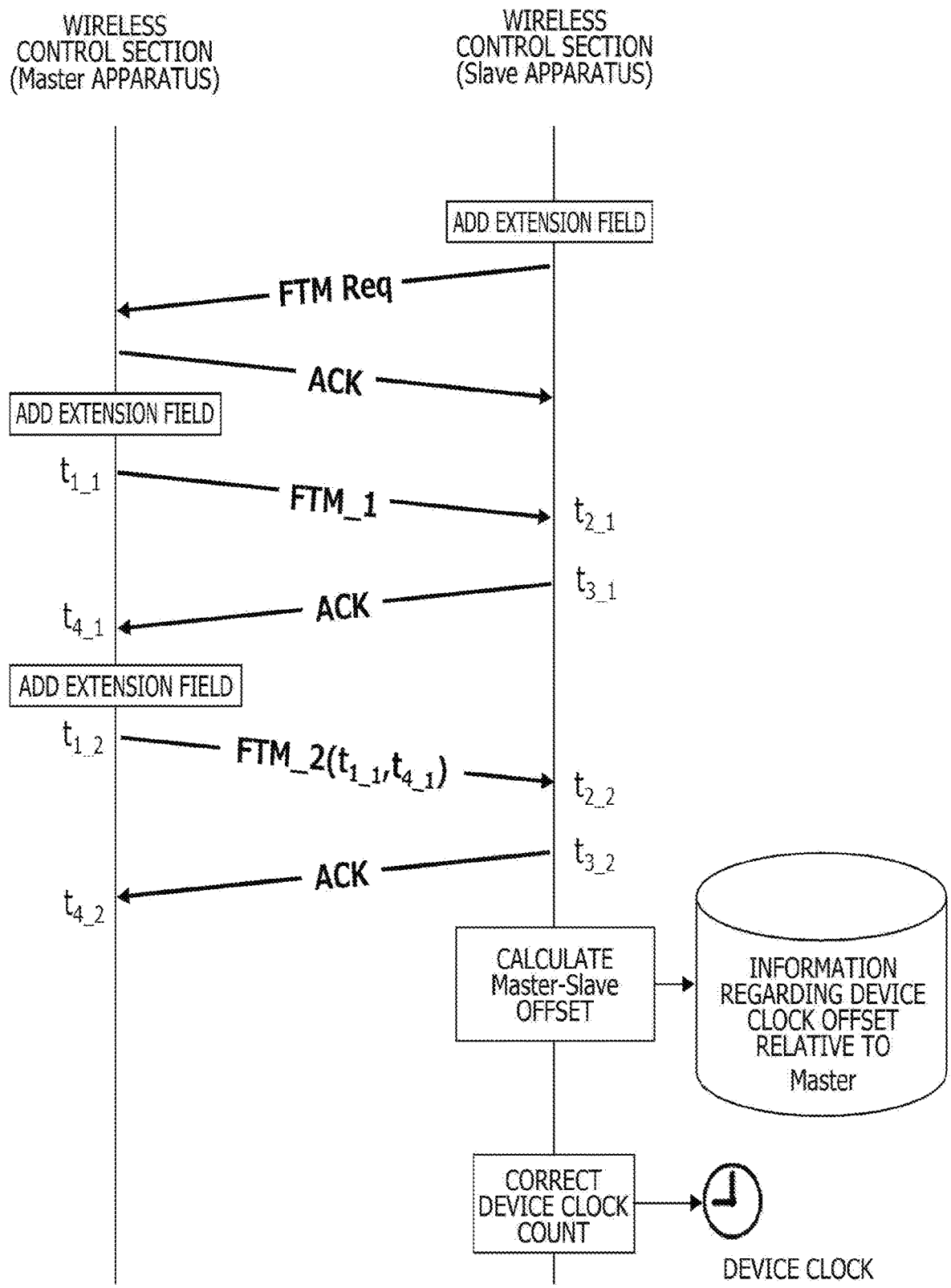
FIG. 11 is a flowchart depicting an exemplary flow of the process of synchronizing the device clock of the wireless apparatus A acting as a master apparatus with the device clock of a wireless apparatus B acting as a slave apparatus.

This process involves synchronizing the device clock of the wireless apparatus A (wireless apparatus 100A) acting as a master apparatus and the device clock of the wireless apparatus B (wireless apparatus 100B) acting as a slave apparatus. FIG. 11 depicts the process flow involved.

This process basically complies with the FTM protocol outlined in FIG. 2. The difference from the protocol is that the process adopts the FTM request frame in a format with extension fields depicted in FIG. 12 and the FTM action frame in a format with extension fields in FIG. 13. At the time of generating the FTM request frame and the FTM action frame (referred to as the notification frames hereunder) respectively, the wireless control section 102 of the wireless apparatus A and the wireless control section 102 of the wireless apparatus B place, in their respectively notification frames, the information regarding the current synchronization status between the system clock and the device clock in each apparatus.

Figure 12:
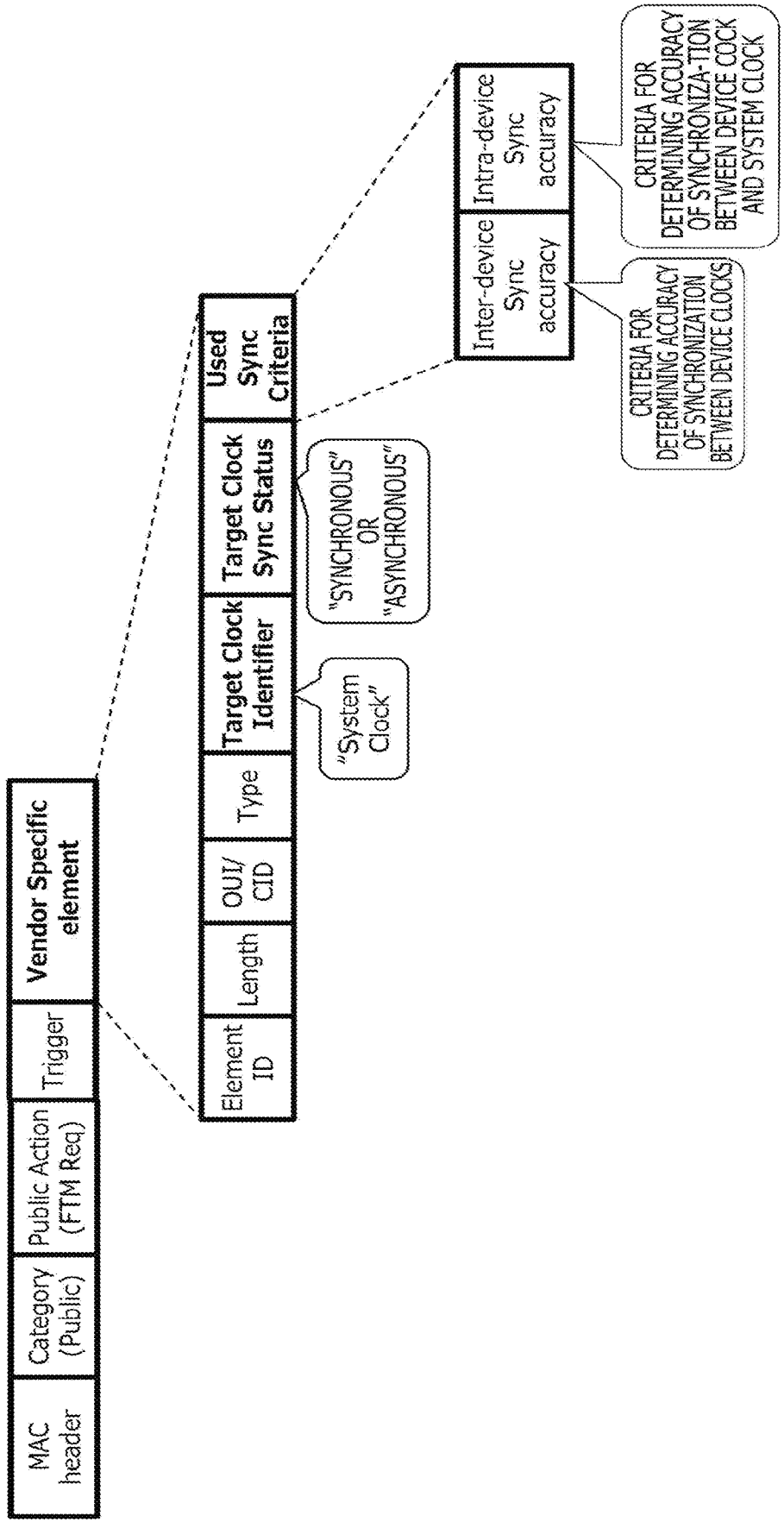
FIG. 12 is a schematic diagram depicting an exemplary format of an extended FTM request frame.
Figure 13:
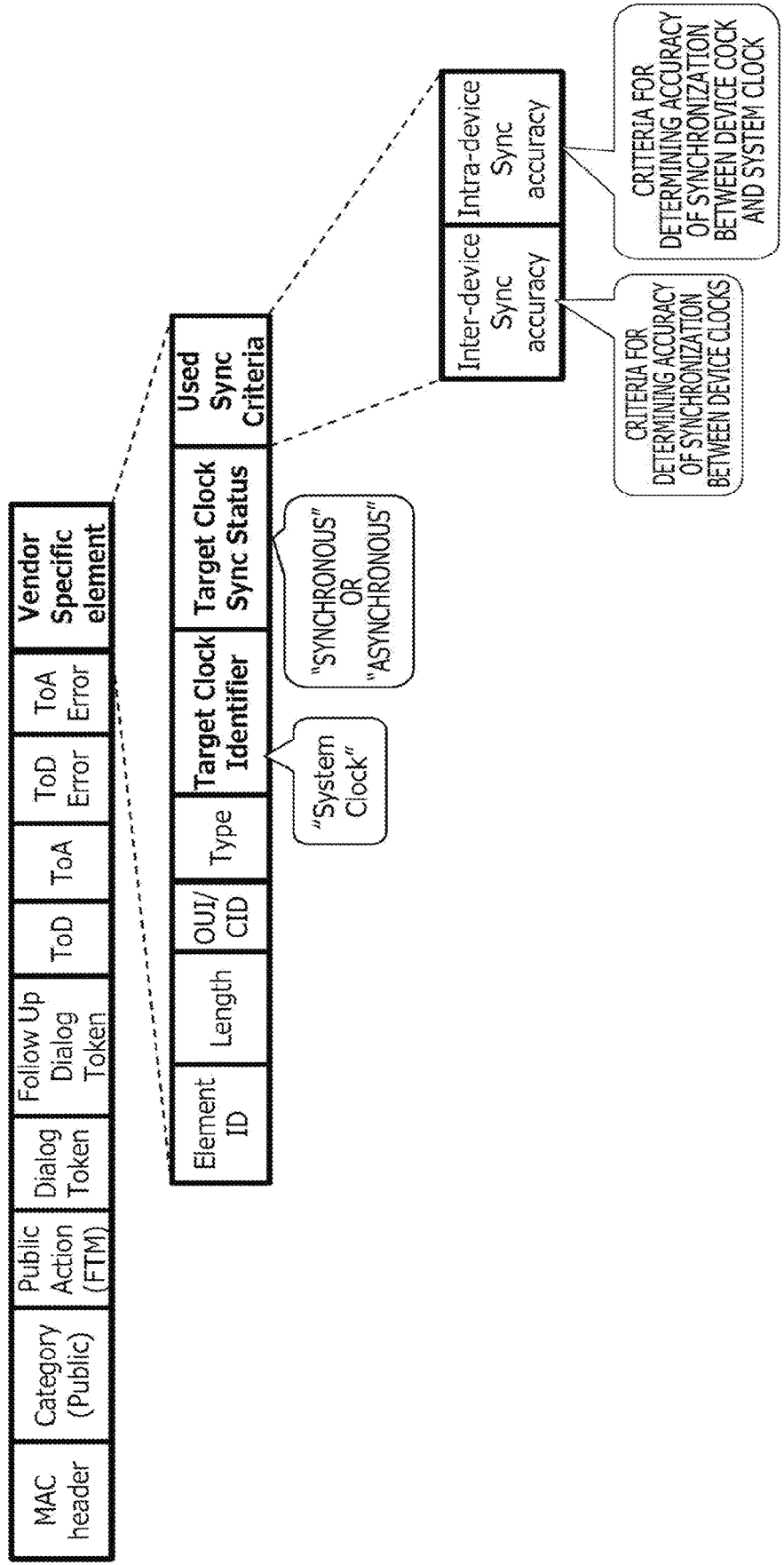
FIG. 13 is a schematic diagram depicting an exemplary format of the extended FTM action frame.

A "Target Clock Sync Status" field depicted in FIGS. 12 and 13 is set with information indicative of "synchronous" or "asynchronous" status. A "Used Sync Criteria" field is set with information regarding the criteria for determining "synchronous" or "asynchronous" status. A "Target Clock Identifier" field is set with information explicitly indicating the synchronization target clock. In this embodiment, the synchronization target clock is indicated to be the system clock. In order to ensure compatibility as distinguished from the format in FIG. 4, the "Type" field is set with a value other than "0."

The wireless control sections 102 of the wireless apparatuses A and B perform the process depicted in FIG. 11 (FTM protocol). Upon receipt of the notification frames, each wireless control section 102 stores the information regarding the synchronization status in the other wireless apparatus set in the extension fields of the received notification frames (see the "Vendor Specific Field" field in FIGS. 12 and 13). The stored information is updated every time the notification frame is received.

The wireless control section 102 of the wireless apparatus B receives an FTM action frame "FTM_2(t1_1, t4_1) from the wireless control section 102 of the wireless apparatus A, and transmits in response an ACK frame to the wireless control section 102 of the wireless apparatus A. Thereafter, the wireless control section 102 of the wireless apparatus B calculates an offset between the device clock of the master apparatus and the device clock of the slave apparatus. Although not explained here in detail, the method for calculating the offset is the same as with the FTM protocol. After calculating the offset, the wireless control section 102 of the wireless apparatus B corrects the count of the device clock in accordance with the calculated offset.

There may be two methods of performing the correction, depending on the implementation. One method involves directly updating the counter value and speed (frequency) of the device clock counter. This method is practicable on the condition that hardware and firmware permit such proceedings. The other method has no recourse to the direct manipulation of the counter. Instead, the method involves separately retaining a conversion correction value for compensating the offset and, at the time of reading the device clock, converting the readout by use of the correction value and returning the converted value to achieve the apparent correction. This method applies even in a case where the counter is not rewritable and is on a free run.

At the time of calculating offsets, a series of information over a predetermined past period regarding the calculated offsets is monitored and retained as the information for knowing the synchronization status between the device clocks of the apparatuses. This information will be used in the synchronization status management process (d), to be discussed below. In a case where the above method without recourse to the direct manipulation of the counter is adopted, the calculated offsets would progressively increase in absolute value. To bypass this inconvenience, not the calculated offsets but the amounts of offsets relative to the clock value are monitored and retained following the conversion using the correction conversion value.

[(c) Device Clock to System Clock Synchronization Process (in the Wireless Apparatus B)]

Figure 14:
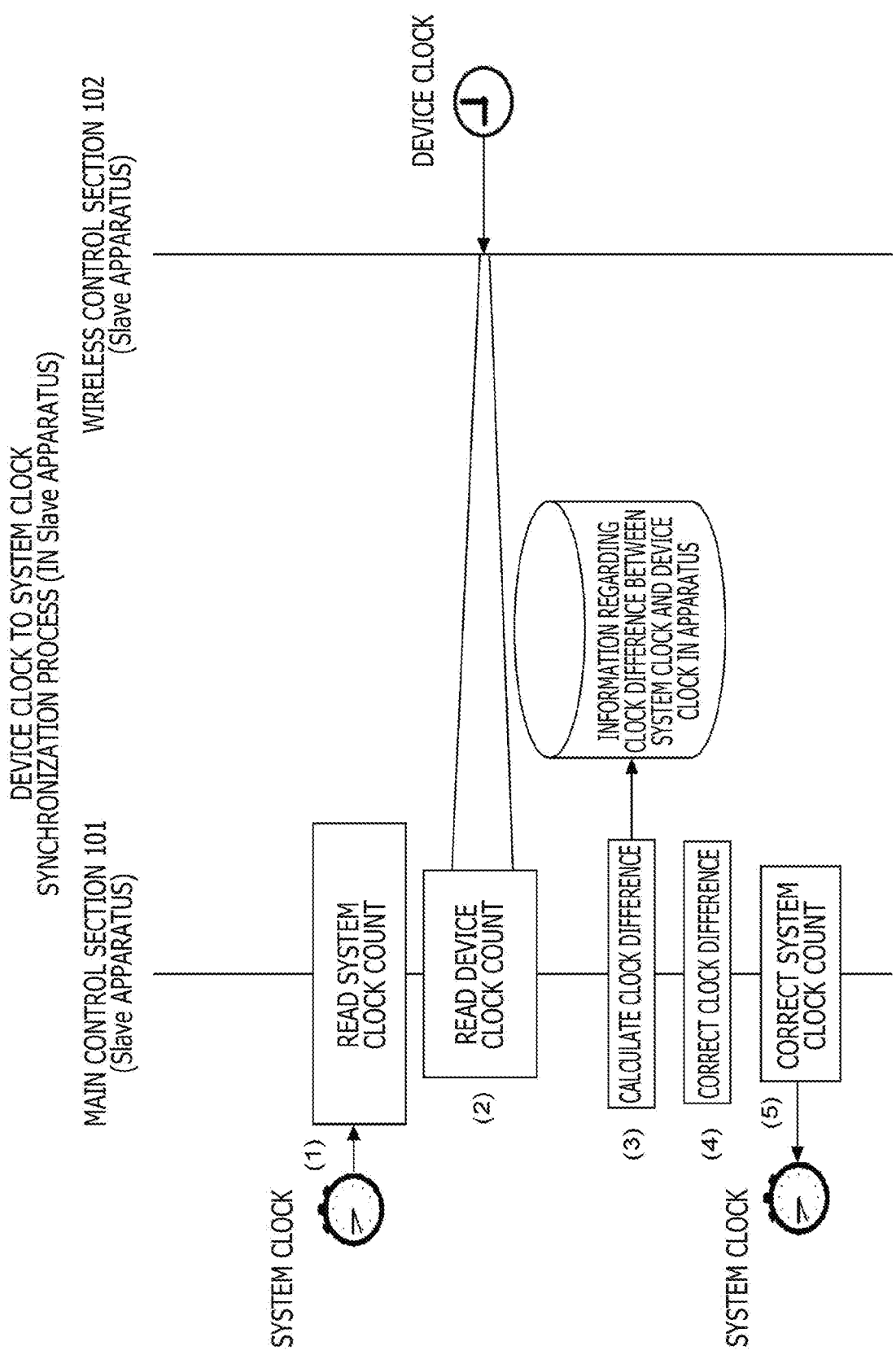
FIG. 14 is a flowchart depicting an exemplary flow of the process of causing the time of the device clock in the wireless apparatus B acting as a slave apparatus to be reflected in its system clock.

This process involves causing the wireless apparatus B (wireless apparatus 100B) acting as a slave apparatus to get the time of its device clock reflected in its system clock. FIG. 14 depicts the process flow involved. Basically, this process reverses the equivalent operations of the above-described "(a) System clock to device clock synchronization process."

(1) First, the main control section 101 reads the count of the system clock.

(2) The main control section 101 then reads the count of the device clock on the side of the wireless control section 102.

(3) The main control section 101 then calculates a clock difference between the device clock and the system clock.

(4) The main control section 101 then performs a correction process on the clock difference to attain higher accuracy. For example, an interface delay and a process delay between the main control section 101 and the wireless control section 102 are estimated by preliminary measurement, and the correction process is performed to eliminate the effects of the delays beforehand. The correction process may be carried out as needed.

(5) Note that the main control section 101 then causes the clock difference to be reflected as a correction value in the system clock to correct the system clock count. There are multiple ways to have the clock difference reflected: get the system clock count directly overwritten with the clock count value, approach the correct clock count in multiple increments using a suitable filter, or gradually comply with the correct clock count by adjusting the manner in which the clock count progresses, for example.

The main control section 101 monitors and retains a series of clock differences over a predetermined past period calculated in step (3) above as the input information for knowing the synchronization status between the device clock (reference clock) and the system clock (synchronization target clock) inside the apparatus. This information will be used in the synchronization status management process (d), to be discussed below.

[(d) Synchronization Status Management Process (in Wireless Apparatuses A and B)]

This process is performed by both the wireless apparatus A (wireless apparatus 100A) acting as a master apparatus and the wireless apparatus B (wireless apparatus 100B) acting as a slave apparatus in parallel with the above-described processes (a) to (c). In this embodiment, the synchronization status management process is carried out by the main control section 101.

Figure 15:
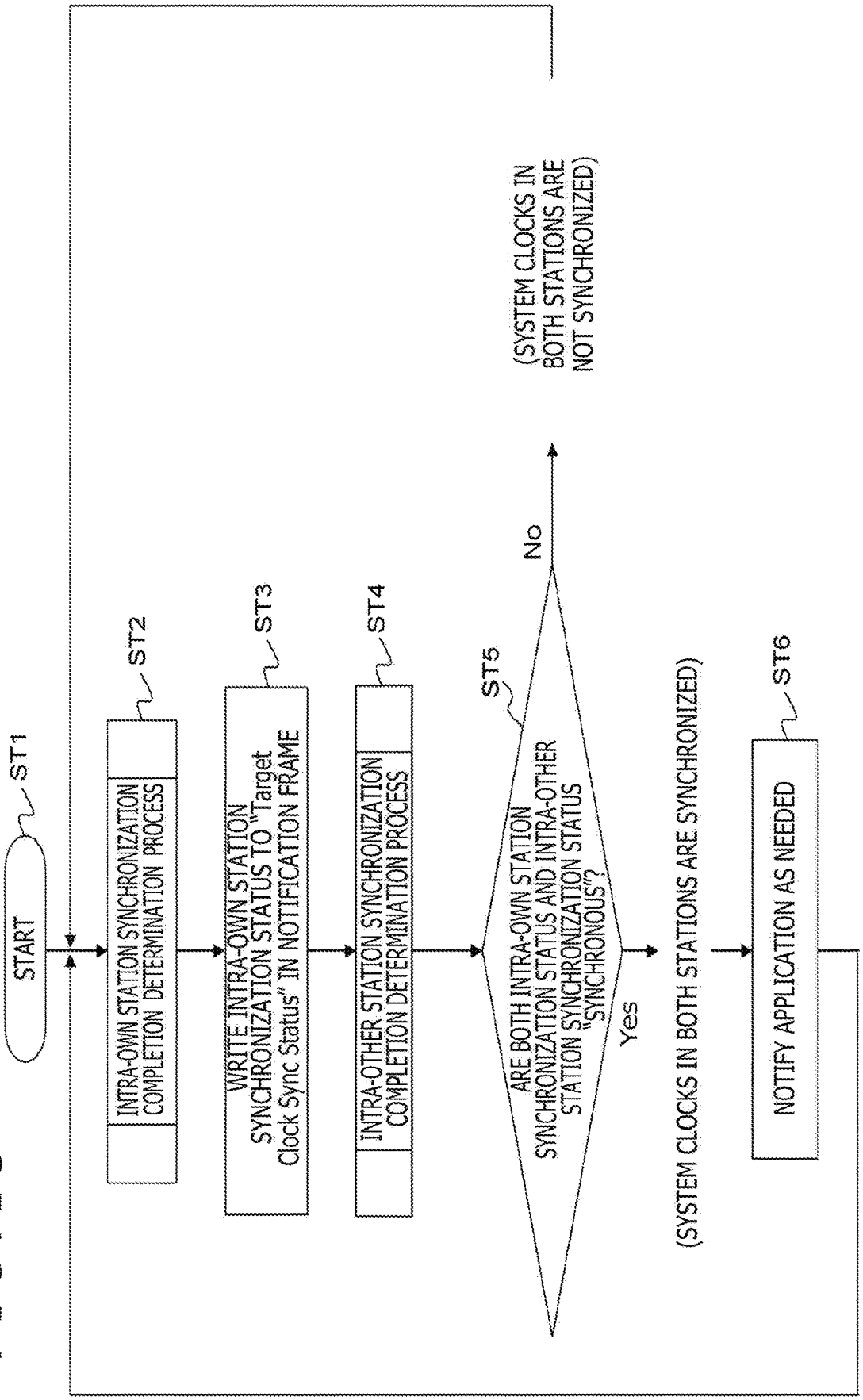
FIG. 15 is a flowchart depicting an exemplary flow of a synchronization status management process between a master apparatus and a slave apparatus.

FIG. 15 depicts the flow of the synchronization status management process. The processing cycle of this process flow is set to reflect a desired cycle in which to verify synchronization status. For example, the processing cycle may be set to 100 ms or to 0.5 s, depending on the requirements of the application that uses the result of the synchronization verification.

In step ST1, the main control section 101 starts the process. Then in step ST2, the main control section 101 performs an intra-own station synchronization completion determination process. This is a process that determines whether or not the system clock (synchronization target clock) in the own station is fully synchronized with its device clock (reference clock). In the wireless apparatus 100B (wireless apparatus B) acting as a slave apparatus, the intra-own station synchronization completion determination process is supplemented with the process of determining whether or not the device clock (reference clock) is fully synchronized with the master side.

Figure 16:
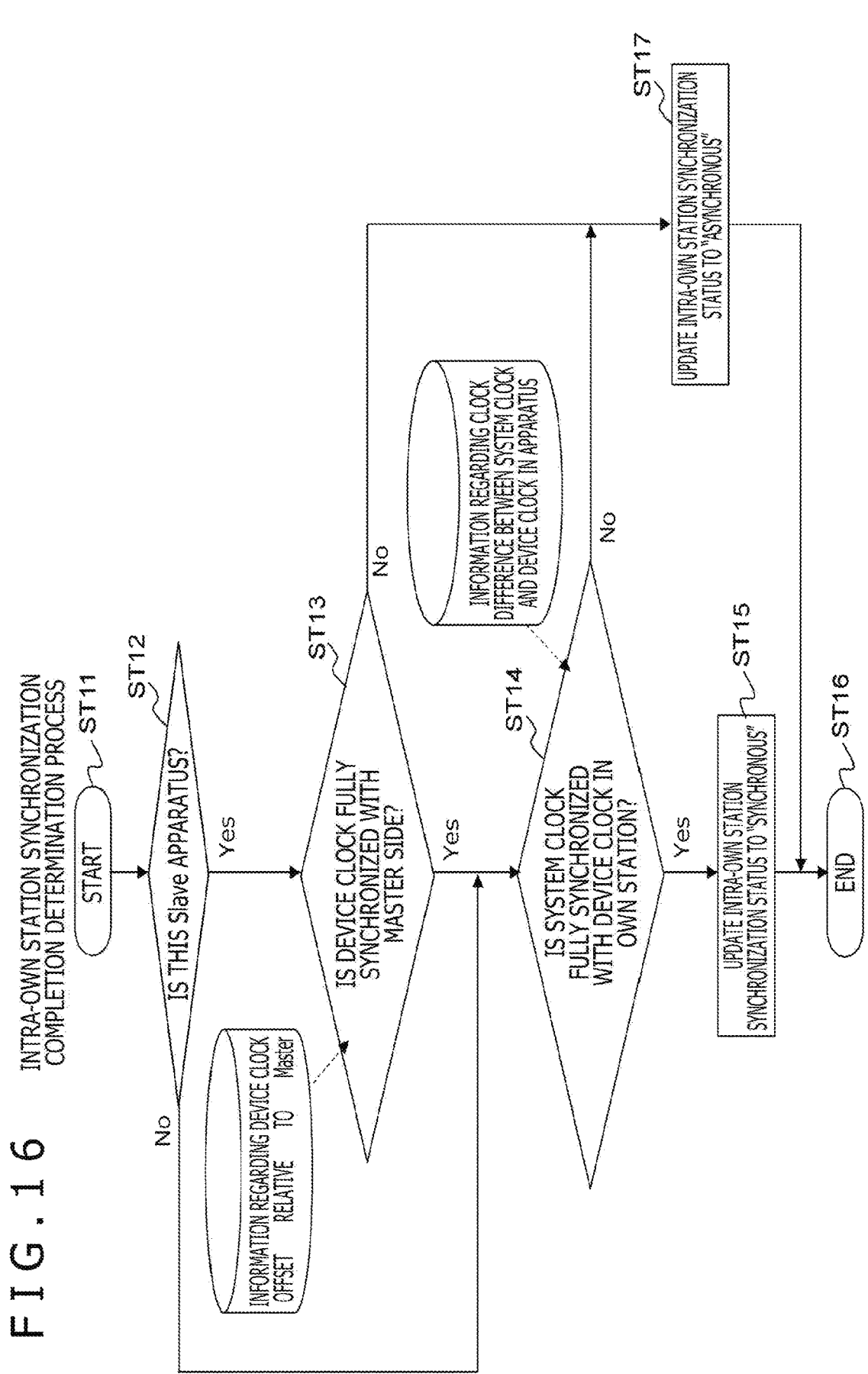
FIG. 16 is a flowchart depicting an exemplary flow of an intra-own station synchronization completion determination process.

FIG. 16 depicts the process flow of the intra-own station synchronization completion determination process. In step ST11, the main control section 101 starts the process. Then in step ST12, the main control section 101 determines whether or not the own station is a slave apparatus. If the own station is determined to be a slave apparatus, the main control section 101 goes to step ST13.

In step ST13, the main control section 101 determines whether or not the device clock is fully synchronized with the master side. The criteria for the determination require that the absolute value of the offset of the device clock relative to the master side fall within a first threshold value (correspond to the required accuracy of synchronization between the device clocks) for a predetermined time period. The time period may be set either automatically by the application that uses the result of the synchronization verification or manually by the user as desired.

Upon determining that the device clock is fully synchronized with the master side, the main control section 101 goes to step ST14. If it is determined in step ST12 that the own station is not a slave apparatus, the main control section 101 immediately goes to step ST14. In the master apparatus, the device clock error between the apparatuses is always regarded as zero, so that the processing of step ST13 is skipped.

In step ST14, the main control section 101 determines whether or not the system clock in the own station is fully synchronized with its device clock. The criteria for the determination require that the absolute value of the clock difference between the system clock and the device clock fall within a second threshold value (corresponds to the required accuracy of synchronization between the system clock and the device clock in the apparatus) for a predetermined time period. The time period may be set either automatically by the application that uses the result of the synchronization verification or manually by the user as desired.

If the system clock in the own station is determined to be fully synchronized with its device clock, the main control section 101 goes to step ST5 and updates the intra-own station synchronization status to "synchronous" status. After the processing in step ST15, the main control section 101 goes to step ST16 and terminates the process.

If in step ST13 the device clock is not determined to be fully synchronized with the master side, or if in step ST14 the system clock in the own station is not determined to be fully synchronized with its device clock, the main control section 101 goes to step ST17 and updates the intra-own station synchronization status to "asynchronous" status. After the processing in step ST17, the main control section 101 goes to step ST16 and terminates the process.

Returning to FIG. 15, the main control section 101 goes to step ST3 and writes the intra-own station synchronization status, i.e., "synchronous" or "asynchronous" status, to the "Target Clock Sync Status" field in the notification frame (see FIGS. 12 and 13). Also, in the notification frame, an "Inter-device Sync Accuracy" field is set with the first threshold value as the criteria for determining the accuracy of synchronization between the device clocks, and an "Intra-device Sync Accuracy" field is set with the second threshold value as the criteria for determining the accuracy of synchronization between the device clock and the system clock.

Then in step ST4, the main control section 101 performs an intra-other station synchronization completion determination process. This is a process that determines whether or not the notification frame (see FIGS. 12 and 13) received from the other station has "synchronous" status written in the "Target Clock Sync Status" field as the synchronization status.

Figure 17:
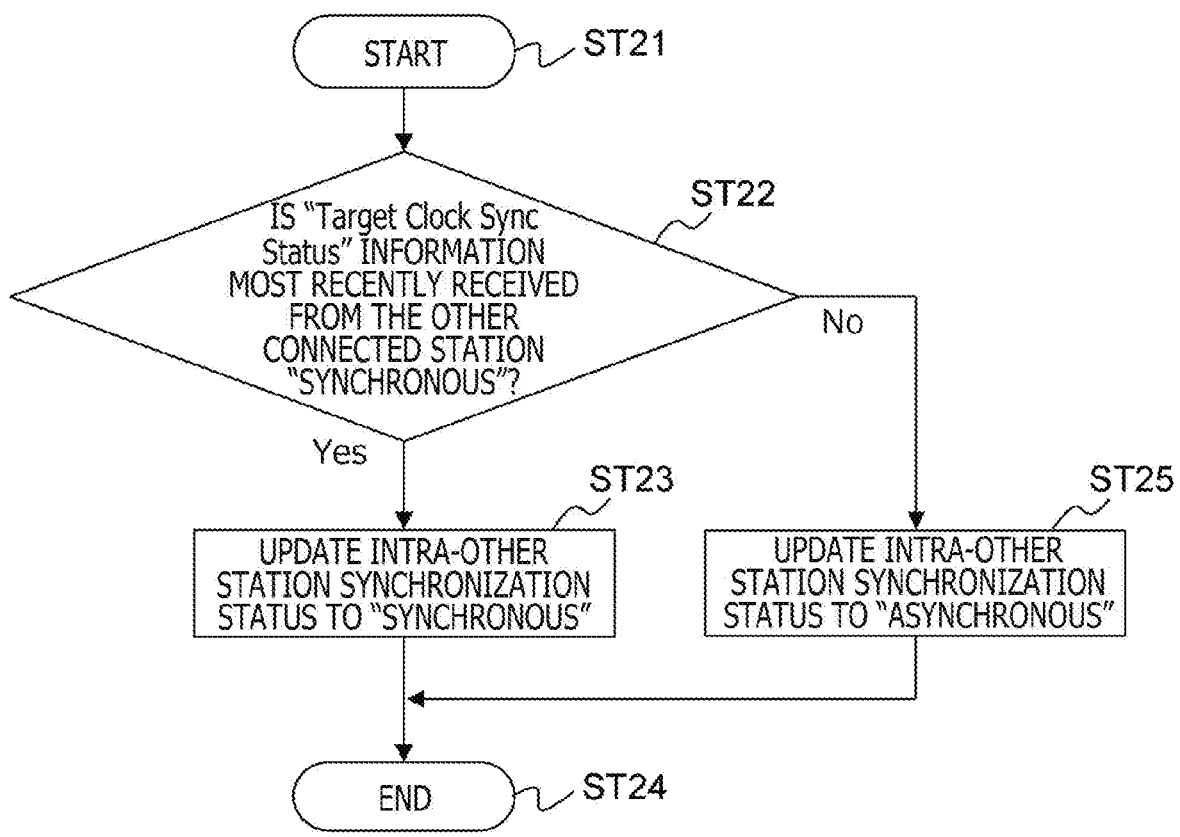
FIG. 17 is a flowchart depicting an exemplary flow of an intra-other station synchronization completion determination process.

FIG. 17 depicts the process flow of the intra-other station synchronization completion determination process. In step S21, the main control section 101 starts the process. Then in step ST22, the main control section 101 determines whether or not the information in the "Target Clock Sync Status" field received most recently from the other connected station is "synchronous" status.

If the information in the field is determined to be "synchronous" status, the main control section 101 goes to step ST23 and updates the intra-other station synchronization status to "synchronous" status. After the processing in step ST23, the main control section 101 goes to step ST24 and terminates the process. If in step ST22 the information is determined to be "asynchronous" status, the main control section 101 goes to step ST25 and updates the intra-other station synchronization status to "asynchronous" status. After the processing in step ST25, the main control section 101 goes to step ST24 and terminates the process.

Returning to FIG. 15, the main control section 101 goes to step ST5 and determines whether or not the intra-own station synchronization status and the intra-other station synchronization status are both "synchronous" status. If it is determined that both the intra-own station synchronization status and the intra-other station synchronization status are not "synchronous" status, the main control section 101 determines that the system clock (synchronization target clock) in the own station and the system clock in the other station are not synchronized, and returns to the processing in step ST2.

On the other hand, if it is determined that both the intra-own station synchronization status and the intra-other station synchronization status are "synchronous" status, the main control section 101 determines that the system clock (synchronization target clock) in the other station and the system clock in the own station are synchronized, and goes to step ST6. In step ST6, the main control section 101 notifies the application of the synchronization as needed for use. For example, in the above-mentioned example of shutter timing synchronization, the application is notified that the shutters are ready to be activated. In the above example of synchronized audio reproduction, the application is notified that preparations for reproduction are completed. In the above example of sound wave distance measurement, the application is notified that preparations are completed for reproducing sound waves for distance measurement. After the processing in step ST6, the main control section 101 returns to the processing of step ST2.

Figure 18:
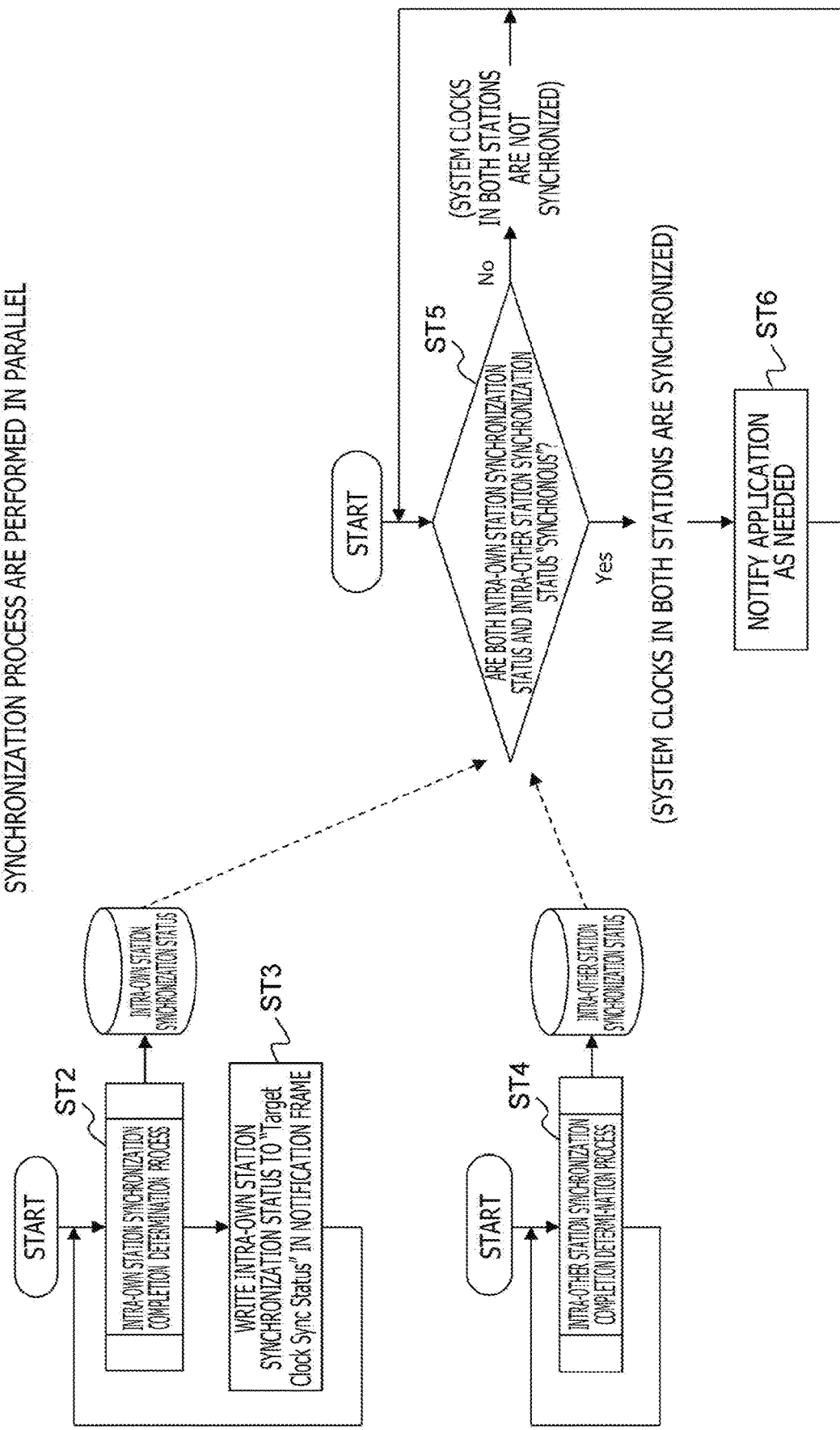
FIG. 18 a flowchart depicting an exemplary flow of the synchronization status management process in a case where the intra-own station synchronization completion determination process and the intra-other station synchronization completion determination process are performed in parallel.

Incidentally, in the process flow of FIG. 15, the intra-own station synchronization completion determination process and the intra-other station synchronization completion determination process may be carried out in parallel with each other. Although not explained here in detail, the process performed in this case is depicted in FIG. 18.

In the first embodiment, as explained above, the wireless apparatus 100A (wireless apparatus A) and the wireless apparatus 100B (wireless apparatus B) each perform the synchronization status management process depicted in FIG. 15. Thus, the wireless apparatus 100A (wireless apparatus A) and the wireless apparatus 100B (wireless apparatus B) are each able to know efficiently whether or not the system clock (synchronization target clock) is correctly synchronized with the other station, and make use of the information regarding the synchronization effectively.

Second Embodiment

A second embodiment of the present technology is explained below. The second embodiment is an example that provides more information than the first embodiment to allow for finer-tuned control. Correspondence between the system configuration and the synchronization procedure of the second embodiment are similar to those of the first embodiment (see FIGS. 5 and 9). As with the first embodiment, the synchronization procedure of the second embodiment is divided into four processes (a) to (d) when explained hereunder.

[(a) System Clock to Device Clock Synchronization Process (in the Wireless Apparatus A)]

This process involves causing the time of the system clock to be reflected in the device clock on the side of the wireless apparatus A (wireless apparatus 100A) acting as a master apparatus. This process is similar to that of the above-described first embodiment (see FIG. 10) and thus will not be discussed further.

[(b) Inter-Device Clock Synchronization Process (Between Wireless Apparatus a and Wireless Apparatus B)]

Figure 19:
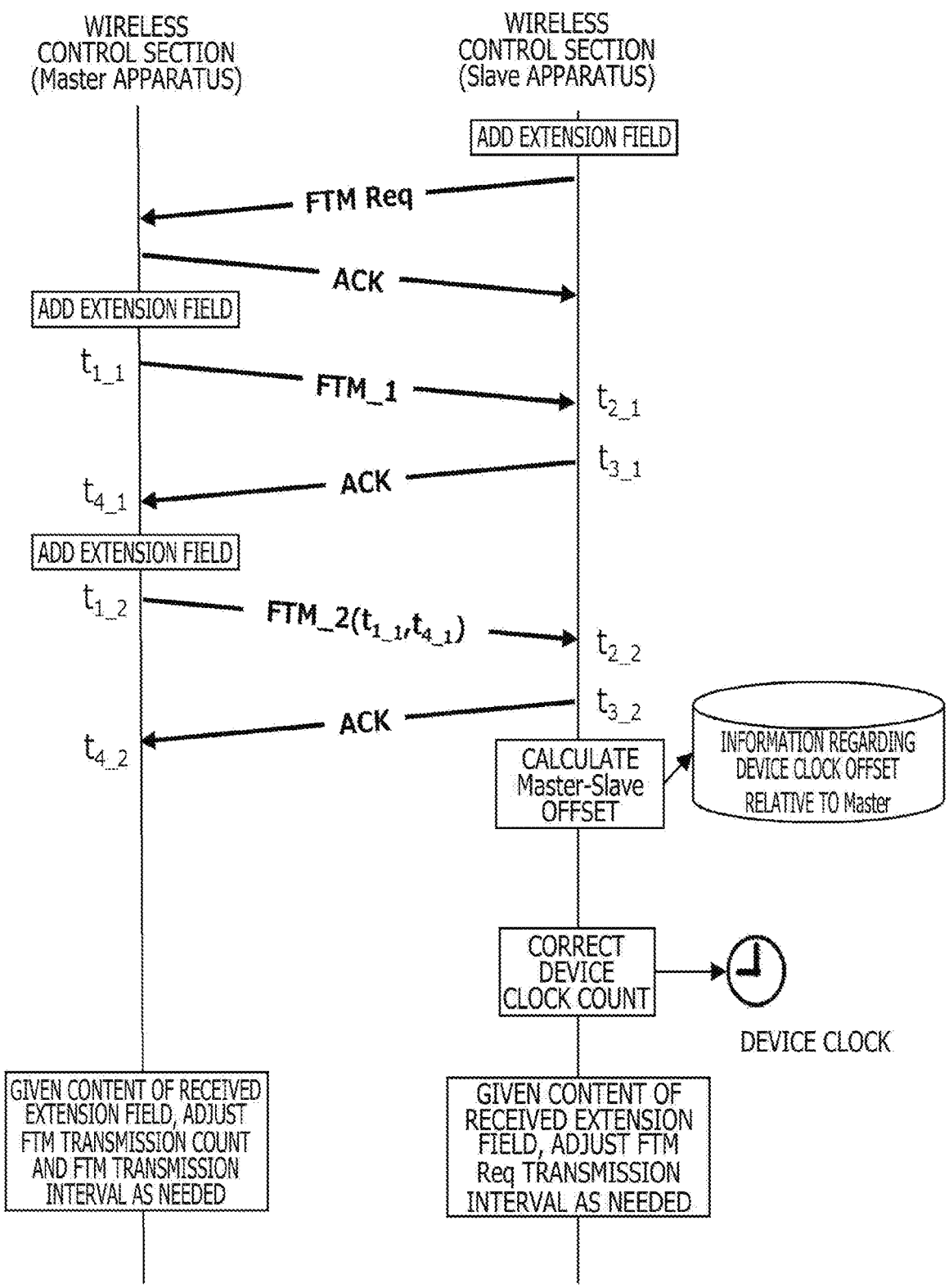
FIG. 19 is a flowchart depicting an exemplary flow of the process of synchronizing the device clock of the wireless apparatus A acting as a master apparatus with the device clock of the wireless apparatus B acting as a slave apparatus.

This process involves synchronizing the device clock of the wireless apparatus A (wireless apparatus 100A) acting as a master apparatus and the device clock of the wireless apparatus B (wireless apparatus 100B) acting as a slave apparatus. FIG. 19 depicts the process flow involved.

As with the process flow depicted in FIG. 11, this process basically complies with the FTM protocol outlined in FIG. 2. In the second embodiment, the FTM request frame and the FTM action frame serving as the notification frames come in the formats with extension fields as depicted in FIGS. 20 and 21.

In the second embodiment, the master apparatus determines the first threshold value (criteria for determining the accuracy of synchronization with the device clock in the other apparatus) and the second threshold value (criteria for determining the accuracy of synchronization between the device clock and the system clock in the apparatus) for use by the synchronization completion determination process in the synchronization status management process (in the wireless apparatuses A and B). The master apparatus causes the slave apparatus to comply with the threshold values thus determined.

Figure 20:
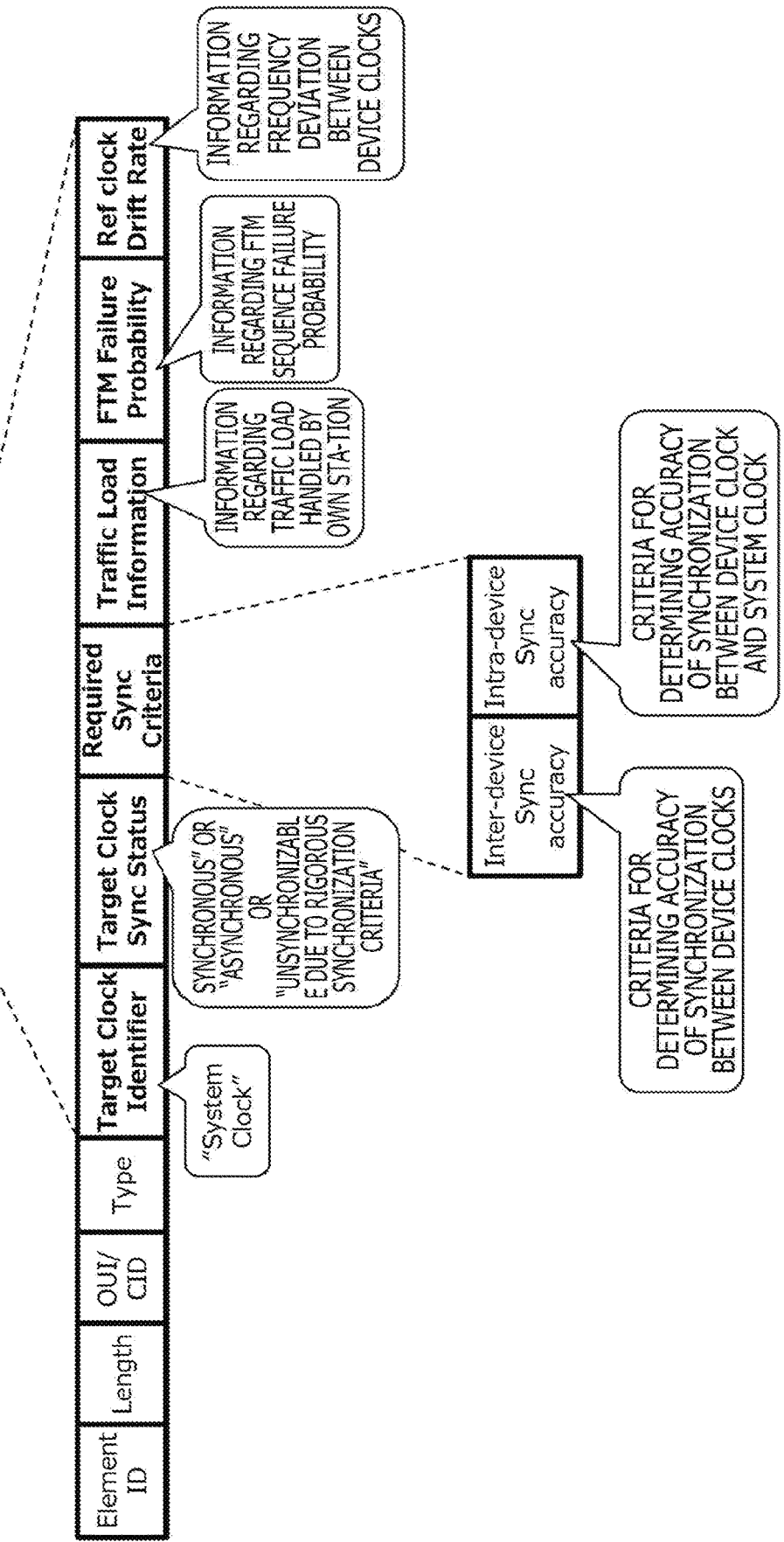
FIG. 20 is a schematic diagram depicting an exemplary format of the extended FTM request frame adopted by a second embodiment of the present technology.
Figure 21:
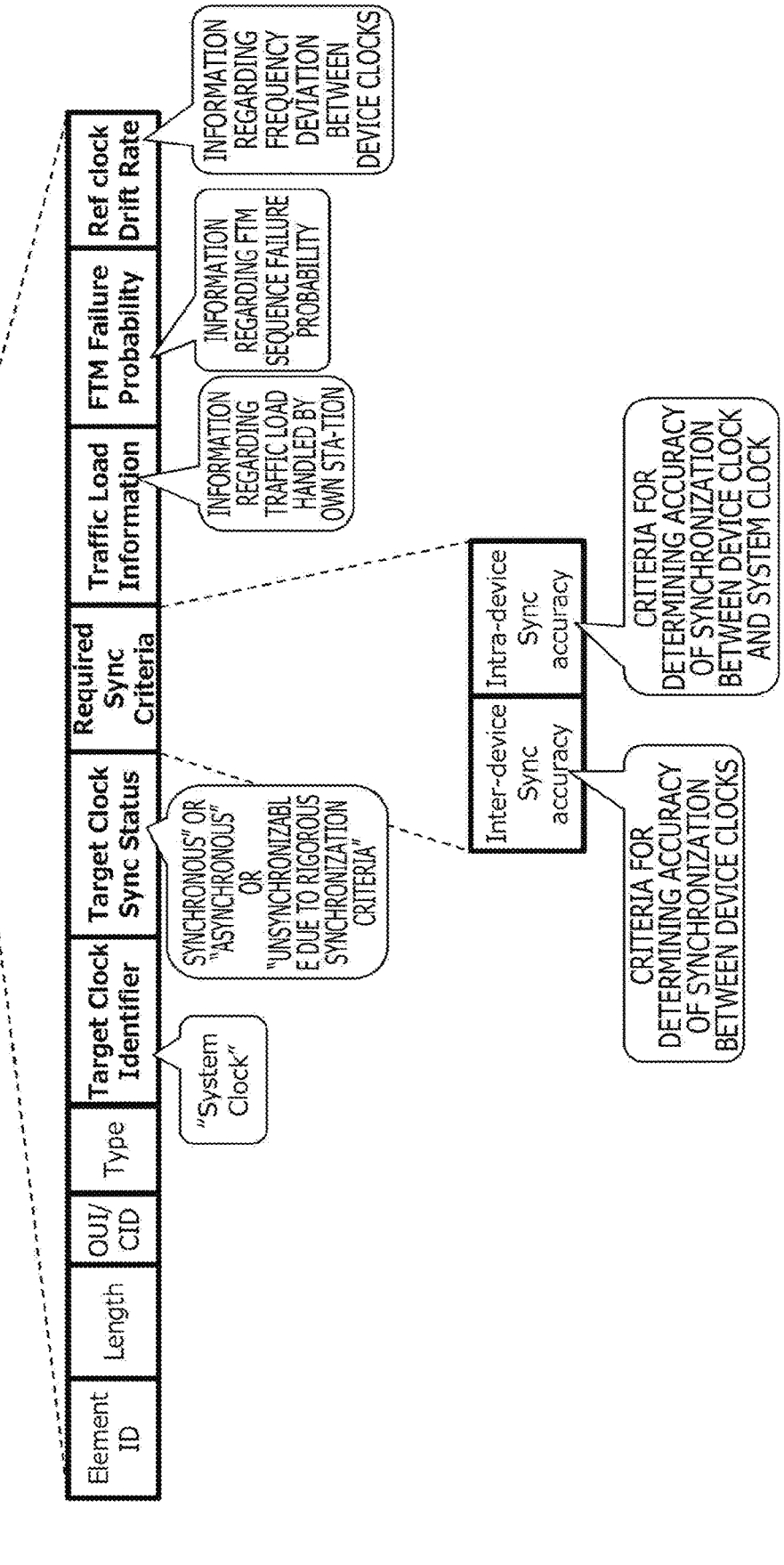
FIG. 21 is a schematic diagram depicting an exemplary format of the extended FTM action frame adopted by the second embodiment.

In a "Required Sync Criteria" field in FIGS. 20 and 21, the "Inter-device Sync accuracy" field is set with the first threshold value as the criteria for determining the accuracy of synchronization between the device clocks, and the "Intra-device Sync accuracy" field is set with the second threshold value as the criteria for determining the accuracy of synchronization between the device clock and the system clock.

In the second embodiment, as mentioned above, the master apparatus determines the first and second threshold values and causes the slave apparatus to comply with these values. Here, the information in the "Required Sync Criteria" field in the FTM request frame may conceivably be different from the information in the "Required Sync Criteria" field in the FTM action frame. For example, the first and second threshold values required of the master apparatus by the slave apparatus may be inserted in the "Required Sync Criteria" field in the FTM request frame.

A "Target Clock Sync Status" field in FIGS. 20 and 21 is set with synchronization status information indicative of "synchronous," "asynchronous," or "unsynchronizable due to rigorous synchronization criteria" status. The "unsynchronizable due to rigorous synchronization criteria" status implies that when the synchronization determination criteria fail to be met despite prolonged attempts at synchronization, the determination criteria are requested to be relaxed. A "Target Clock Identifier" field is set with information explicitly indicating the synchronization target clock. In this embodiment, the synchronization target clock is indicated to be the system clock. In order to ensure compatibility as distinguished from the format in FIG. 4, the "Type" field is set with a value other than "0."

Also, in the second embodiment, the information for optimally adjusting the frequency of FTM sequence execution is exchanged for the purpose of improving the accuracy of device clock synchronization by FTM. The information is set in "Traffic Load Information," "FTM Failure Probability," and "Ref clock Drift Rate" fields depicted in FIGS. 20 and 21.

The "Traffic Load Information" field is set with information regarding the load of traffic (reception and transmission) handled by the own station using its wireless interface. Specifically, the field is set with information indicative of the amount of information transmitted and received over a predetermined time period in the most recent past. This information serves as an indicator of wireless load. This field is utilized in a case where the own station acts as a wireless slave apparatus, since the wireless load cannot be known as long as the master apparatus is communicating with a party other than the own station.

The "FTM Failure Probability" field is set with information regarding the probability of FTM frame transmission failure. If an FTM frame exchange fails, the offset value is not updated. In some cases, the clock drift between the reference clocks might be accumulated until the exchange succeeds.

The "Ref Clock Drift Rate" is set with information regarding clock drift between the device clocks, i.e., regarding a frequency deviation therebetween. Given the trend of past offset calculation results, it is possible to know at what rate the clocks deviate from each other. This information may also be used in adjusting the first threshold value.

The wireless control sections 102 in the wireless apparatuses A and B perform adjustments using the information in the "Traffic Load Information," "FTM Failure Probability," and "Ref clock Drift Rate" fields. For example, as depicted in FIG. 19, the slave apparatus adjusts an FTM request frame transmission interval and the master apparatus adjusts the number of FTM action frame transmissions per FTM request frame and an FTM action frame transmission interval, in such a manner as to increase the FTM sequence success rate and to minimize the clock offset.

[(c) Device Clock to System Clock Synchronization Process (in the Wireless Apparatus B)]

This process involves causing the wireless apparatus B (wireless apparatus 100B) acting as a slave apparatus to get the time of its device clock reflected in its system clock. The process is similar to that of the first embodiment (see FIG. 14) and thus will not be discussed further.

[(d) Synchronization Status Management Process (in Wireless Apparatuses A and B)]

This process is performed by both the wireless apparatus A (wireless apparatus 100A) acting as a master apparatus and the wireless apparatus B (wireless apparatus 100B) acting as a slave apparatus in parallel with the above-described processes (a) to (c). The parent flow of this synchronization status management process is in common with the first embodiment (see FIG. 15). However, the content of the intra-own station synchronization completion determination process and that of the intra-other station synchronization completion determination process are different from those of the first embodiment.

Figure 22:
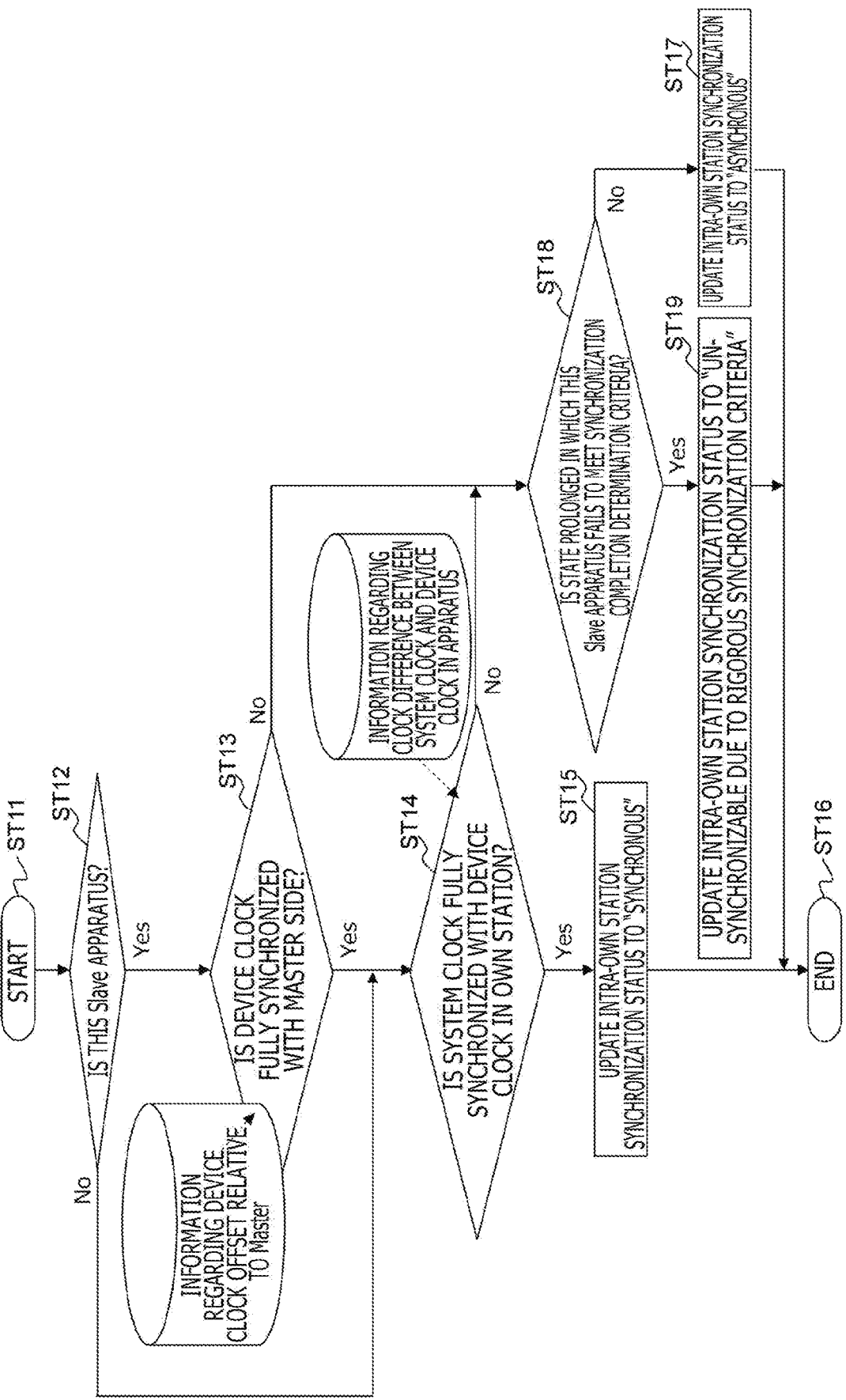
FIG. 22 is a flowchart depicting an exemplary flow of another intra-own station synchronization completion determination process.

FIG. 22 depicts the process flow of the intra-own station synchronization completion determination process. In FIG. 22, the steps corresponding to those in FIG. 16 (process flow of an intra-own station synchronization completion determination process with the first embodiment) are designated by like reference characters and will not be discussed in detail below where appropriate.

In the second embodiment, the slave apparatus uses, as the synchronization determination criteria (first and second threshold values) for use in steps ST13 and ST14, the synchronization determination criteria communicated from the master apparatus using the "Required Sync Criteria" field in the notification frame. That is, the slave apparatus performs synchronization determination in compliance with the synchronization determination criteria determined by the master apparatus.

If in step ST13 the device clock is not determined to be fully synchronized with the master side, or if in step ST14 the system clock is not determined to be fully synchronized with the device clock in the own station, the main control section 101 goes to step ST18 and determines whether or not the state is prolonged in which this slave apparatus fails to meet the synchronization completion determination criteria.

If it is determined that the state is prolonged in which this slave apparatus fails to meet the synchronization completion determination criteria, the main control section 101 goes to step ST19. If not, the main control section 101 goes to step ST17 and updates the own-station synchronization status to "asynchronous" status. The main control section 101 then goes to step ST16 and terminates the process.

In step ST19, the main control section 101 updates the own-station synchronization status to "unsynchronizable due to rigorous synchronization criteria" status. After the processing in step ST19, the main control section 101 goes to step ST16 and terminates the process.

In the slave apparatus in which the own-station synchronization status is updated to "unsynchronizable due to rigorous synchronization criteria" status, the main control section 101 notifies the master apparatus of the updated status by writing the update to the "Target Clock Sync Status" field in step ST3 in the process flow of FIG. 15. In this case, the main control section 101 may alternatively notify the master apparatus of the updated status by writing the required synchronization determination criteria to the "Required Sync Criteria" field in the notification frame.

Figure 23:
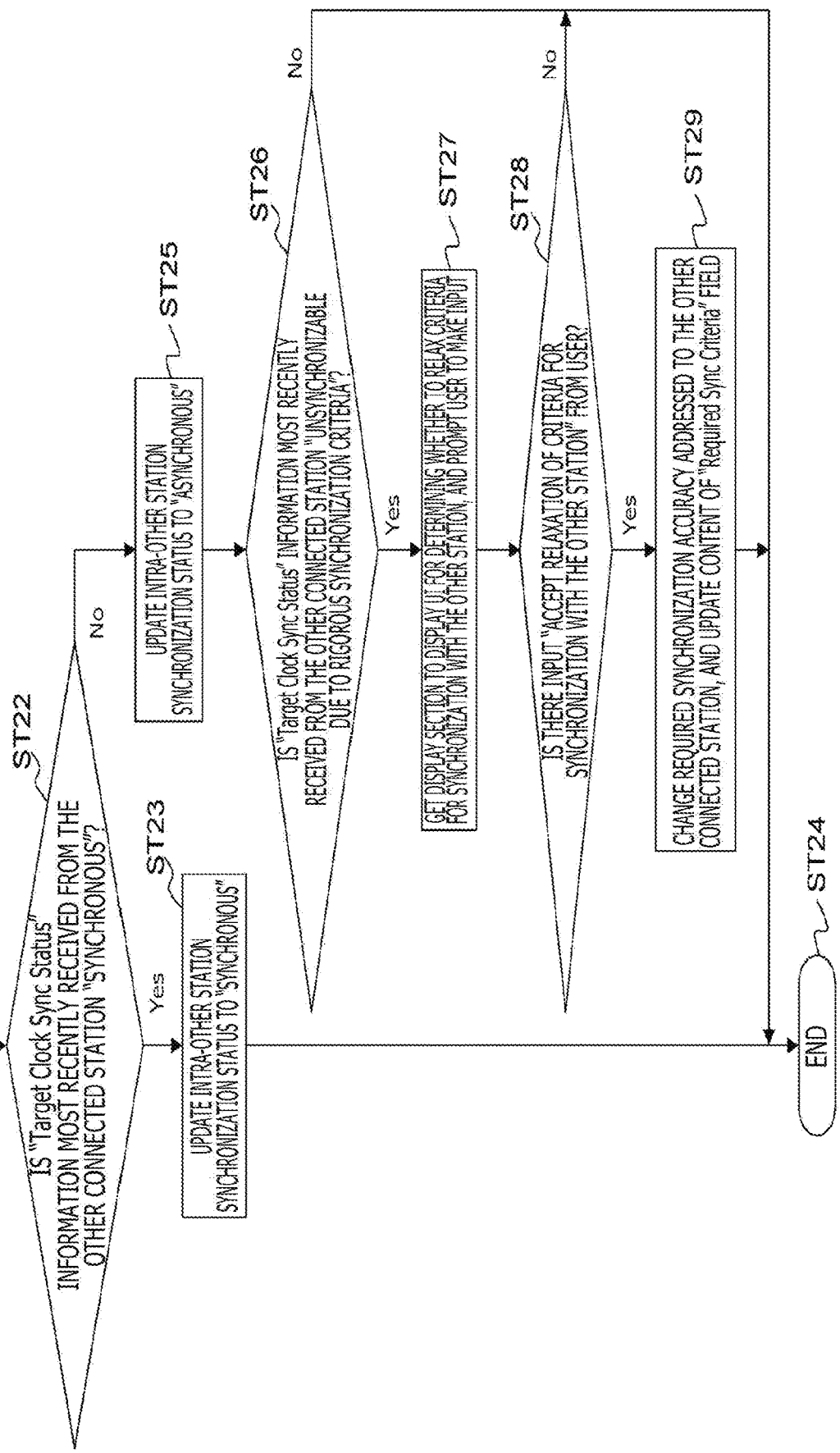
FIG. 23 is a flowchart depicting an exemplary flow of another intra-other station synchronization completion determination process.

FIG. 23 depicts the process flow of another intra-other station synchronization completion determination process. In FIG. 23, the steps corresponding to those in FIG. 17 (process flow of the intra-other station synchronization completion determination process with the first embodiment) are designated by like reference characters and will not be discussed in detail below where appropriate.

After the processing in step ST25, the main control section 101 goes to step ST26. In step ST26, the main control section 101 determines whether or not the information in the "Target Clock Sync Status" field most recently received from the other connected station is "unsynchronizable due to rigorous synchronization criteria."

Figure 24:
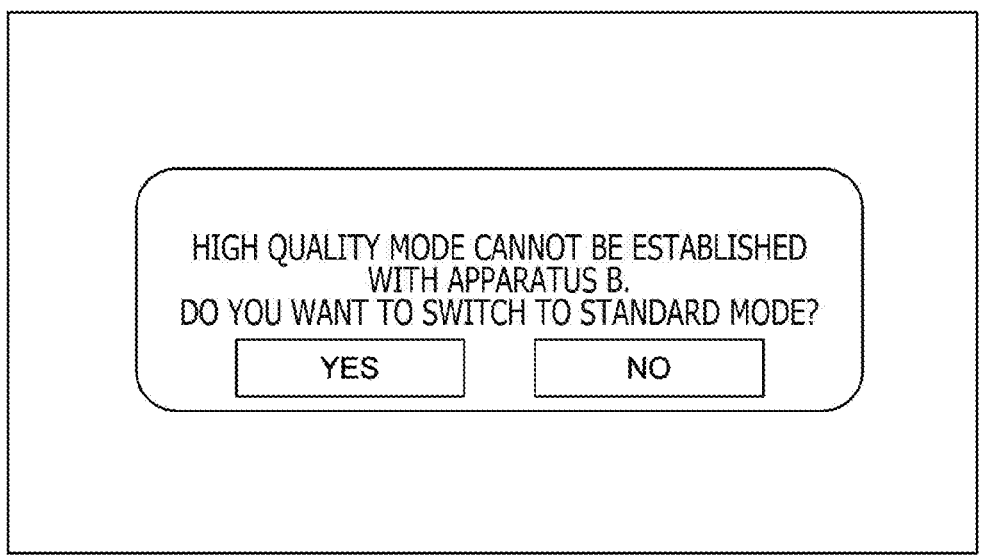
FIG. 24 is a schematic diagram depicting an exemplary user interface (UI) for determining whether or not or not to relax synchronization criteria.

If the information is determined to be "unsynchronizable due to rigorous synchronization criteria," the main control section 101 goes to step ST27, causes the display section 103 to display a user interface (UI) for determining whether or not to relax the criteria for synchronization with the other station, and thereby prompts the user to make an input. FIG. 24 depicts an example of the UI display.

This is an example in which, with "high quality mode" currently in use, the user is requested to determine whether or not to switch to "standard mode." Here, the "high quality mode" refers to a mode in which synchronization is to be achieved with the initially required synchronization accuracy. The "standard mode" refers to a mode in which synchronization is to be accomplished with less required synchronization accuracy.

Although the example in FIG. 24 assumes two modes, i.e., "high quality mode" and "standard mode," there may be provided modes corresponding to three or more required synchronization accuracy levels, along with a concomitant UI display for the user to make a selection. As another alternative, the example in FIG. 24 may be arranged to display the currently required accuracy value.

Returning to FIG. 23 and following the processing in step ST27, the main control section 101 goes to step ST28 and determines whether or not there is an input "accept relaxation of criteria for synchronization with the other station" from the user, i.e., whether or not "YES" is selected in the UI display example in FIG. 24. If the input of accepting the relaxation of the criteria for synchronization is determined to be made, the main control section 101 goes to step ST29, changes the required synchronization accuracy addressed to the other connected station, i.e., the synchronization completion determination criteria desired to be used by the other station, and updates accordingly the content of the "Required Sync Criteria" field in the notification frame.

After the processing in step ST29, the main control section 101 goes to step ST24 and terminates the process. If in step ST26 the information is not determined to be "unsynchronizable due to rigorous synchronization criteria," or if in step ST28 the input of accepting the relaxation of the criteria for synchronization is not determined to be made, the main control section 101 immediately goes to step ST24 and terminates the process.

As explained above, the second embodiment provides, in addition to the advantageous effects similar to those of the above-described first embodiment, the ability to exchange the information required for FTM sequence adjustment and to adjust settings as needed. Furthermore, the second embodiment notifies the other apparatus of the synchronization accuracy determination criteria so that the other apparatus will comply therewith and, if synchronization cannot be achieved due to rigorous criteria, notifies the other apparatus to that effect and solicits readjustment of the criteria.

Third Embodiment

A third embodiment of the present technology is explained below. With the above-described second embodiment, the user is allowed to determine whether or not to dynamically change the synchronization determination criteria through the user interface. This feature can also be utilized in cases other than where the master apparatus manages the determination criteria as with the second embodiment.

The third embodiment is an example that, based on the first embodiment, allows the user to determine whether or not to dynamically change the synchronization determination criteria through the user interface. Correspondence between the system configuration and the synchronization procedure of the third embodiment are similar to those of the first embodiment (see FIGS. 5 and 9). As with the first embodiment, the synchronization procedure of the third embodiment is divided into four processes (a) to (d) when explained hereunder.

[(a) System Clock to Device Clock Synchronization Process (in the Wireless Apparatus A)]

This process involves causing the time of the system clock to be reflected in the device clock on the side of the wireless apparatus A (wireless apparatus 100A) acting as a master apparatus. This process is similar to that of the above-described first embodiment (see FIG. 10) and thus will not be discussed further.

[(b) Inter-Device Clock Synchronization Process (Between Wireless Apparatus a and Wireless Apparatus B)]

This process involves synchronizing the device clock of the wireless apparatus A (wireless apparatus 100A) acting as a master apparatus and the device clock of the wireless apparatus B (wireless apparatus 100B) acting as a slave apparatus. This process is also similar to that of the above-described first embodiment (see FIG. 10) and thus will not be discussed further. The formats of the transmitted and received frames are also similar to those of the first embodiment.

[(c) Device Clock to System Clock Synchronization Process (in the Wireless Apparatus B)

This process involves causing the wireless apparatus B (wireless apparatus 100B) acting as a slave apparatus to get the time of its device clock reflected in its system clock. The process is similar to that of the first embodiment (see FIG. 14) and thus will not be discussed further.

[(d) Synchronization Status Management Process (in Wireless Apparatuses A and B)]

This process is performed by both the wireless apparatus A (wireless apparatus 100A) acting as a master apparatus and the wireless apparatus B (wireless apparatus 100B) acting as a slave apparatus in parallel with the above-described processes (a) to (c).

The third embodiment is based on the assumption that the first threshold value (criteria for determining the accuracy of synchronization with the device clock in the other apparatus) and the second threshold value (criteria for determining the accuracy of synchronization between the device clock and the system clock in the apparatus) are to be set and managed by the apparatuses involved at their discretion. Also, in the third embodiment, the parent flow of the synchronization status management process is in common with the first embodiment (see FIG. 15). However, the content of the intra-own station synchronization completion determination process, i.e., an internal process of the third embodiment, is different from that of the first embodiment.

FIG. 26 depicts the process flow of the intra-own station synchronization completion determination process performed by the third embodiment. In FIG. 26, the steps corresponding to those in FIG. 16 (process flow of the intra-own station synchronization completion determination process with the first embodiment) are designated by like reference characters and will not be discussed in detail below where appropriate.

After the processing in step ST17, the main control section 101 goes to step ST30. In step ST30, the main control section 101 determines whether or not the state is prolonged in which the criteria are not considered to be met in determining compliance with the above-mentioned first or second threshold value.

If the state is determined to be prolonged, the main control section 101 goes to step ST31, causes the display section 103 to display a user interface (UI) for determining whether or not to relax the synchronization completion determination criteria for use by the own station, and prompts the user to make an input. An example of the UI display is similar to that of the second embodiment (see FIG. 24).

The main control section 101 then goes to step ST32 and determines whether or not there is an input "accept relaxation of criteria for synchronization" from the user, i.e., whether or not "YES" is selected in the UI display example in FIG. 24. If the input of accepting the relaxation of the criteria for synchronization is determined to be made, the main control section 101 goes to step ST33, changes the synchronization completion determination criteria for use by the own station, and updates accordingly the content of the "Used Sync Criteria" field in the notification frames to be used in the next and subsequent transmission.

After the processing in step ST33, the main control section 101 goes to step ST16 and terminates the process. If in step ST30 the state is not determined to be prolonged, or if in step ST32 the input of accepting the relaxation of the criteria for synchronization is not determined to be made, the main control section 101 immediately goes to step ST16 and terminates the process.

As explained above, the third embodiment provides, in addition to the advantageous effects similar to those of the above-described first embodiment, the ability for each apparatus involved to manage the synchronization completion determination criteria and to adjust the criteria as needed and authorized by the user.

Table 1 below lists brief overviews of the first, second, and third embodiments of the present technology, and outlines the differences therebetween.

TABLE 1

| | Sync status | Apparatus determining sync criteria | Added information fields | Adjustment of sync criteria | Adjustment of FTM frequency |
|---|---|---|---|---|---|
| First embodiment | "Synchronous"/ "Asynchronous" | Both master and slave | Threshold value of use determination | Not made | Not made |
| Second embodiment | "Synchronous"/ "Asynchronous"/ "Unsynchronizable due to rigorous sync criteria" | Master only | Threshold value of requirements Traffic load information FTM failure probability Clock drift rate | Made | Made |

TABLE 1-continued

| | Sync status | Apparatus determining sync criteria | Added information fields | Adjustment of sync criteria | Adjustment of FTM frequency |
|---|---|---|---|---|---|
| Third embodiment | "Synchronous"/ "Asynchronous" | Both master and slave | Threshold value of use determination | Made | Not made |

<2. Variations>

The embodiments of the present technology have been described above using examples in which the notification frames are set with the determination criteria and the information required for adjusting the FTM sequence. In a case where there are differences between the device clock (reference clock) and the system clock (synchronization target clock) in terms of the number of digits that may be expressed or in terms of count granularity, i.e., in unit differences, the notification frame may be supplemented with additional information that compensates the differences.

Figure 25:
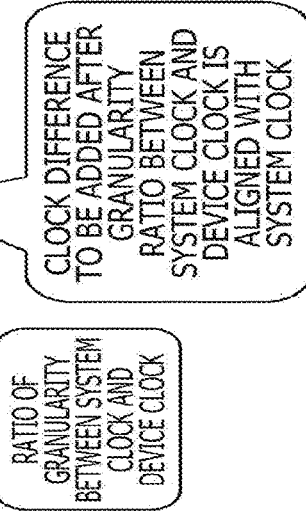
FIG. 25 is a schematic diagram depicting an exemplary FTM action frame in which "clock granularity ratio" information and "clock difference" information are included in the vendor specific element of the frame.

FIG. 25 depicts an example in which the vendor specific element in the FTM action frame of the second embodiment is set with "clock granularity ratio" information and "clock difference" information. The "clock granularity ratio" information refers to the ratio of granularity between the system clock and the device clock. The "clock difference" information refers to the difference to be compensated after the ratio of granularity between the system clock and the device clock is aligned with the system clock. Alternatively, the two items of additional information may be included as a separate second vendor specific element.

The embodiments of the present technology have also been described above using examples in which the synchronization protocol for the wireless layer is the Fine Timing Measurement (FTM) protocol. With this technology, however, the synchronization protocol for the wireless layer is not limited to the FTM protocol. The TM (Timing Measurement) protocol may also serve the purpose. In this case, the FTM action frame in the inter-device clock synchronization process depicted in FIG. 11 need only be replaced with the TM action frame. Thus in this case, the present technology is similarly applicable with only the change of the notification frame set with the information in the vendor specific element.

The embodiments of the present technology have also been described above using examples in which the notification frames are the FTM request frame and the FTM action frame. However, the notification frames are not limited to these two and may be some other frames such as a different management frame and a Public Action frame. The present technology is usable in conjunction with any types of frames as long as they can carry the equivalent information.

In the above-described embodiments, the system clock is the synchronization target clock to be synchronized between the two wireless apparatuses via the device clock (reference clock). Alternatively, some other clock such as the clock for managing the time of a medium processing section that manages medium such as audio and video medium may serve as the synchronization target clock. Although not explained here in detail, the synchronization procedure of such a medium processing section is similar to that of the above embodiments except that the system clock of the main control section 101 is simply replaced with the clock of the medium processing section.

Although not discussed above, the vendor specific element in the notification frame need not contain all frames explained in connection with the first and second embodiments. Instead, the vendor specific element may include only part of these fields.

In the above-described embodiments, the system clock of the wireless apparatus 100A acting as a master apparatus is used as the master clock for the entire system. Alternatively, the device clock of the wireless apparatus 100A as the master apparatus may conceivably be used as the master clock. In this case, the wireless apparatus 100A may perform the process (c) in place of the process (a) in the above-described synchronization procedure.

Although not discussed above, the extended FTM action frame based on the 802.1AS standard and the extension fields of the present technology may be used in combination. In this case, the respective vendor specific elements are arrayed consecutively.

The present technology may be implemented preferably in the following configurations.

(1)

A wireless apparatus including:

a main control section configured to manage time using a first clock;

a wireless control section configured to manage time using a second clock; and a clock synchronization management section configured to manage a clock synchronization state, in which the wireless control section notifies another wirelessly connected wireless apparatus of information regarding the clock synchronization state through transmission of a frame.

(2)

The wireless apparatus according to (1) described above, in which the information regarding the clock synchronization state includes information regarding synchronization status.

(3)

The wireless apparatus according to (2) described above, in which the synchronization status has either two types of status, i.e., synchronous and asynchronous, or three types of status, i.e., synchronous, asynchronous, and unsynchronizable due to vigorous synchronization criteria.

(4)

The wireless apparatus according to (3) described above, in which if the absolute value of a clock difference between the first clock and the second clock within a predetermined time period is equal to or smaller than a second threshold value, the clock synchronization management section determines that the synchronous status is reached.

(5)

The wireless apparatus according to (3) described above, in which if the absolute value of a clock difference between the first clock and the second clock within a predetermined time period is equal to or smaller than a second threshold value, and if the absolute value of an offset of the second clock relative to the other wireless apparatus within a predetermined time period is equal to or smaller than a first threshold value, the clock synchronization management section determines that the synchronous status is reached.

(6)
The wireless apparatus according to (3) described above, in which
if the asynchronous status is prolonged for a predetermined time period, the clock synchronization management section determines that the unsynchronizable status due to vigorous synchronization criteria is reached.

(7)
The wireless apparatus according to any one of paragraphs (2) to (6) described above, in which
the information regarding the clock synchronization state further includes criteria for determining the synchronization status.

(8)
The wireless apparatus according to any one of paragraphs (2) to (7) described above, in which
the information regarding the clock synchronization state further includes information regarding a transmission failure probability of the frame.

(9)
The wireless apparatus according to any one of paragraphs (2) to (8) described above, in which
the information regarding the clock synchronization state further includes information regarding a wireless traffic load.

(10)
The wireless apparatus according to any one of paragraphs (2) to (9) described above, in which
the information regarding the clock synchronization state further includes information regarding clock drift between the second clock and that of the other wireless apparatus.

(11)
The wireless apparatus according to any one of paragraphs (1) to (10) described above, in which
the wireless control section transmits to the other wireless apparatus information for associating the first clock with the second clock through transmission of the frame, and
the associating information further includes information regarding a clock difference between the two clocks.

(12)
The wireless apparatus according to (11) described above, in which
the associating information further includes information regarding a clock granularity ratio between the two clocks.

(13)
The wireless apparatus according to any one of paragraphs (1) to (12) described above, in which
the wireless control section transmits the information regarding the clock synchronization state as part of the frame for measuring the time of the wireless control section relative to the other wireless apparatus.

(14)
The wireless apparatus according to any one of paragraphs (1) to (13) described above, further including:
a display section configured to display a user interface based on the information regarding the clock synchronization state.

(15)
The wireless apparatus according to (14) described above, in which
if the asynchronous status is prolonged for a predetermined time period, the clock synchronization management section causes the display section to display the user interface requesting a user to determine whether or not to relax synchronization completion determination criteria for use by the own station, the clock synchronization management section further changing the synchronization criteria if the user accepts the relaxation of the criteria.

(16)
A wireless apparatus processing method for use with a wireless apparatus that includes:
a main control section configured to manage time using a first clock;
a wireless control section configured to manage time using a second clock; and
a clock synchronization management section configured to manage a clock synchronization state;
the wireless apparatus processing method including a step of causing the wireless control section to notify another wirelessly connected wireless apparatus of information regarding the clock synchronization state through transmission of a frame.

(17)
A wireless apparatus including:
a main control section configured to manage time using a first clock; and
a wireless control section configured to manage time using a second, in which
the wireless control section detects information regarding a clock synchronization state by receiving a frame from another wirelessly connected wireless apparatus, and
the wireless apparatus further includes a display section configured to display a user interface based on the information regarding the clock synchronization state.

(18)
The wireless apparatus according to (17) described above, in which
the information regarding the clock synchronization state includes information regarding synchronization status.

(19)
The wireless apparatus according to (18) described above, in which
if the synchronization status indicates unsynchronizable status due to rigorous synchronization criteria, the display section displays the user interface requesting a user to determine whether or not to relax the criteria for synchronization with the other wireless apparatus; and in which, if the user accepts the relaxation of the criteria for synchronization with the other wireless apparatus, the wireless control section notifies the other wireless apparatus of the relaxation of the synchronization criteria through transmission of the frame.

(20)
The wireless apparatus according to any one of paragraphs (17) to (19) described above, further including:
an application section configured to perform processing based on the first clock.

REFERENCE SIGNS LIST

10 . . . Wireless system
100A, 100B . . . Wireless apparatus
101 . . . Main control section 102 . . . Wireless control section
103 . . . Display section

The invention claimed is:

1. A wireless apparatus, comprising:
processing circuitry configured to
manage time using a first clock;
manage time using a second clock;
manage a clock synchronization state between the first clock and the second clock; and
notify another wireless apparatus, wirelessly connected to the wireless apparatus, of synchronization information regarding the clock synchronization state through transmission of a frame, wherein
the synchronization information includes information regarding a synchronization status between the first clock and the second clock, and
the synchronization status indicates:
two types of status, synchronous and asynchronous, or
three types of status, synchronous, asynchronous, and unsynchronizable due to vigorous synchronization criteria.

2. The wireless apparatus according to claim 1, wherein in a case that an absolute value of a clock difference between the first clock and the second clock within a predetermined time period is equal to or smaller than a threshold value, the processing circuitry determines that the synchronous status is reached.

3. The wireless apparatus according to claim 1, wherein in a case that an absolute value of a clock difference between the first clock and the second clock within a predetermined time period is equal to or smaller than a first threshold value, and in a case that an absolute value of an offset of the second clock relative to the other wireless apparatus within a predetermined time period is equal to or smaller than a second, threshold value, the processing circuitry determines that the synchronous status is reached.

4. The wireless apparatus according to claim 1, wherein in a case that an asynchronous status is prolonged for a predetermined time period, the processing circuitry determines that the unsynchronizable status due to vigorous synchronization criteria is reached.

5. The wireless apparatus according to claim 1, wherein the synchronization information further includes criteria for determining the synchronization status.

6. The wireless apparatus according to claim 1, wherein the synchronization information further includes information regarding a transmission failure probability of the frame.

7. The wireless apparatus according to claim 1, wherein the synchronization information further includes information regarding a wireless traffic load.

8. The wireless apparatus according to claim 1, wherein the synchronization information further includes information regarding clock drift between the second clock and that of the other wireless apparatus.

9. A wireless apparatus, comprising:
processing circuitry configured to
manage time using a first clock;
manage time using a second clock;
manage a clock synchronization state between the first clock and the second clock; and
transmit a frame to another wireless apparatus that is wirelessly connected to the wireless apparatus, wherein
the frame includes synchronization information regarding the clock synchronization state including at least a synchronization status between the first clock and the second clock, and the frame further includes associating information for associating the first clock with the second clock, and
the associating information includes information regarding a clock difference between the first clock and the second clock.

10. The wireless apparatus according to claim 9, wherein the associating information further includes information regarding a clock granularity ratio between the first clock and the second clock.

11. The wireless apparatus according to claim 1, wherein the processing circuitry transmits the synchronization information as part of the frame for measuring time relative to the other wireless apparatus.

12. The wireless apparatus according to claim 1, further comprising:
a display configured to display a user interface based on the synchronization information.

13. The wireless apparatus according to claim 12, wherein, in a case that an asynchronous status is prolonged for a predetermined time period, the processing circuitry controls the display to display the user interface requesting a user to determine whether or not to relax synchronization completion determination criteria for use by the wireless apparatus, and changes the synchronization criteria in a case that the user accepts the relaxation of the criteria.

14. A wireless apparatus, comprising:
processing circuitry configured to
manage time using a first clock;
manage time using a second clock; and
detect synchronization information regarding a clock synchronization state by receiving a frame from another wireless apparatus wirelessly connected to the wireless apparatus; and
a display configured to display a user interface based on the information regarding the clock synchronization state, wherein
the synchronization information includes information regarding a synchronization status between the first clock and the second clock; and
the synchronization status indicates:
two types of status, synchronous and asynchronous, or
three types of status, synchronous, asynchronous, and unsynchronizable due to vigorous synchronization criteria.

15. The wireless apparatus according to claim 14, wherein in a case that the synchronization status indicates unsynchronizable status due to rigorous synchronization criteria, the processing circuitry controls the display to display the user interface requesting a user to determine whether or not to relax the criteria for synchronization with the other wireless apparatus, and in a case that the user accepts the relaxation of the criteria for synchronization with the other wireless apparatus, the processing circuitry notifies the other wireless apparatus of the relaxation of the synchronization criteria through transmission of the frame.

16. The wireless apparatus according to claim 14, wherein the processing circuitry is further configured to perform processing based on the first clock.

17. The wireless apparatus according to claim 14, wherein the synchronization information further includes criteria for determining the synchronization status.

18. The wireless apparatus according to claim 14, wherein the synchronization information further includes information regarding a transmission failure probability of the frame.

19. The wireless apparatus according to claim 14, wherein the synchronization information further includes information regarding a wireless traffic load.

20. The wireless apparatus according to claim 14, wherein the synchronization information further includes information regarding clock drift between the second clock and that of the other wireless apparatus.

\* \* \* \* \*